United States Patent
Colgrove et al.

(10) Patent No.: US 7,293,133 B1
(45) Date of Patent: Nov. 6, 2007

(54) PERFORMING OPERATIONS WITHOUT REQUIRING SPLIT MIRRORS IN A MULTI-CLASS FILE SYSTEM

(75) Inventors: John Colgrove, Los Altos, CA (US); Par Botes, Mountain View, CA (US); Michael Timpanaro, Cupertino, CA (US); Charles H. Silvers, Santa Clara, CA (US); Peter Vajgel, Menlo Park, CA (US)

(73) Assignee: Veritas Operating Corporation, Mountain View, CA (US)

( * ) Notice: Subject to any disclaimer, the term of this patent is extended or adjusted under 35 U.S.C. 154(b) by 780 days.

(21) Appl. No.: 10/749,299

(22) Filed: Dec. 31, 2003

(51) Int. Cl.
 *G06F 12/08* (2006.01)
(52) U.S. Cl. ............... 711/111; 711/117; 711/202
(58) Field of Classification Search .......... 711/111, 711/117, 202
 See application file for complete search history.

(56) References Cited

U.S. PATENT DOCUMENTS

| | | | |
|---|---|---|---|
| 5,278,970 A | 1/1994 | Pence | |
| 5,475,834 A | 12/1995 | Anglin et al. | |
| 5,822,780 A | 10/1998 | Schutzman | |
| 6,029,179 A * | 2/2000 | Kishi | 707/202 |
| 6,061,692 A * | 5/2000 | Thomas et al. | 707/200 |
| 6,311,252 B1 | 10/2001 | Raz | |
| 6,330,572 B1 | 12/2001 | Sitka | |
| 6,804,719 B1 | 10/2004 | Cabrera et al. | |
| 6,947,959 B1 | 9/2005 | Gill | |
| 6,961,811 B2 | 11/2005 | Dawson et al. | |
| 7,103,740 B1 * | 9/2006 | Colgrove et al. | 711/162 |
| 7,225,211 B1 * | 5/2007 | Colgrove et al. | 707/205 |
| 2002/0069324 A1 | 6/2002 | Gerasimov et al. | |
| 2002/0120763 A1 | 8/2002 | Miloushev et al. | |
| 2003/0023713 A1 | 1/2003 | Slater et al. | |
| 2003/0046270 A1 | 3/2003 | Leung et al. | |
| 2003/0056069 A1 | 3/2003 | Cabrera et al. | |
| 2003/0065898 A1 | 4/2003 | Flamma et al. | |
| 2003/0225801 A1 | 12/2003 | Devarakonda et al. | |

(Continued)

OTHER PUBLICATIONS

"DiskXtender for UNIX System Administrator Guide—Release 2.5," Legato Systems, On., Feb. 2003, (30 pages).

(Continued)

*Primary Examiner*—Hyung Sough
*Assistant Examiner*—Kenneth M Lo
(74) *Attorney, Agent, or Firm*—Robert C. Kowert; Meyertons, Hood, Kivlin, Kowert & Goetzel, P.C.

(57) ABSTRACT

System and method for performing operations in a multi-class file system without requiring split mirrors. For one or more storage classes in the multi-class file system, operations that require stable copies of the storage classes may be performed without using split mirrors. In one embodiment, read-only data may be assigned and/or migrated to lower storage classes, and operations may be performed on the read-only storage classes without using split mirrors. In one embodiment, to perform an operation without using a split mirror, a write lock of a storage class may be examined to determine if the write-locked storage class has been written to during the operation on the storage class and, if so, the operation may be retried for the storage class. In one embodiment, the file system software may be blocked from enabling a storage class for writing for the duration of the operation on the storage class.

31 Claims, 16 Drawing Sheets

U.S. PATENT DOCUMENTS

| | | |
|---|---|---|
| 2004/0039891 A1 | 2/2004 | Leung et al. |
| 2004/0049513 A1 | 3/2004 | Yakir et al. |
| 2004/0054656 A1 | 3/2004 | Leung et al. |
| 2005/0033757 A1 | 2/2005 | Greenblatt et al. |
| 2005/0071560 A1 | 3/2005 | Bolik |
| 2005/0203964 A1 | 9/2005 | Matsunami et al. |

OTHER PUBLICATIONS

Mark Hoover, "Accidental Value," Acuitive, Inc., Hoov's Musings (vol. 6, No. 6), www.acuitive.com/musings/hmv6-6.htm, Jun. 2003, (4 pages).

Richard McDougal, "Getting to know the Solaris File System, Part 1," www.solarisinternals.com/si/reading/sunworldonline, May 1999, (16 pages).

Veritas Software Corporation, "File System," White Paper, Nov. 1996, 17 pages.

Philip Trautman, SGI, "Scalability and Performance in Modern Filesystems," White Paper, 2000, 14 pages.

Digital Equipment Corporation, "Advanced File System and Utilities for Digital UNIX, Guide to File System Administration," Version 4.0, Apr. 1996, 158 pages.

Compaq, "Advanced File System Quick Reference," Jan. 2002, 66 pages.

IBM, "IBM Tivoli Storage Manager," 2002, 6 pages.

Hewlett Packard, "Specifying Data Availability in Multi-Device File Systems," John Wilkes, et al., Apr. 1, 1990, pp. 56-59.

* cited by examiner

| MyDrive/MyFolder/MyFile | First Storage Class:Device:Block Number |

*FIG. 8A*

| MyDrive/MyFolder/MyFile | Second Storage Class:Device:Block Number |

*FIG. 8B*

| MyDrive/MyFolder/MyFile | Third Storage Class:Device:Block Number |

*FIG. 8C*

| MyDrive/MyFolder/MyFile | First Storage Class:Device:Block Number |

*FIG. 8D*

PERFORMING OPERATIONS WITHOUT REQUIRING SPLIT MIRRORS IN A MULTI-CLASS FILE SYSTEM

BACKGROUND OF THE INVENTION

1. Field of the Invention

This invention is related to the field of computer systems and, more particularly, to data storage systems.

2. Description of the Related Art

In data storage environments such as corporate LANs, total storage needs are increasing and storage costs are an increasing part of the IT budget. More and/or higher capacity storage devices may be added, but this solution is expensive and difficult to manage, and does not address the root of the problem. There is a limit to storage capacity no matter how much storage capacity is added. This solution tends to provide a constant cost per byte for storage, as it tends not to take advantage of lower cost-per-byte storage devices. A high percentage of data stored in a storage environment may be infrequently accessed, or never accessed at all after a certain time. Lower cost-per-byte for storage may be realized using methods that move at least some of this infrequently accessed data off more expensive storage devices and on to the less expensive storage devices.

Hierarchical Storage Management (HSM) is a data storage solution that provides access to vast amounts of storage space while reducing the administrative and storage costs associated with data storage. HSM systems may move files along a hierarchy of storage devices that may be ranked in terms of cost per megabyte of storage, speed of storage and retrieval, and overall capacity limits. Files are migrated along the hierarchy to less expensive forms of storage based on rules tied to the frequency of data access.

In HSM systems, data access response time and storage costs typically determine the appropriate combination of storage devices used. A typical three tier HSM architecture may include hard drives as primary storage, rewritable optical as secondary storage, and tape as tertiary storage. Alternatively, hard drives may be used for secondary storage, and WORM (Write Once, Read Many) optical may be used as tertiary storage.

Rather than making copies of files as in a backup system, HSM migrates files to other forms of storage, freeing hard disk space. Events such as crossing a storage threshold and/or reaching a certain file "age" may activate the migration process. As files are migrated off primary storage, HSM leaves stubs to the files on the hard drive(s). These stubs point to the location of the file on the alternative storage, and are used in automatic file retrieval and user access. The stub remains within the file system of the primary storage, but the file itself is migrated "offline" out of the file system onto the alternative storage (e.g. tape).

In HSM, when a file that has been migrated to a lower rank of storage, such as tape, is accessed by an application, the stub may be used to retrieve and restore the file from the lower rank of storage. The file appears to be accessed by the application from its initial storage location, and demigration of the file back into the file system is performed automatically by the HSM system using the stub. While on the surface this demigration may appear transparent to the user, in practice the process of accessing and restoring the file from offline storage (e.g. tape) may introduce a noticeable time delay (seconds, minutes, or even hours) to the user when compared to accessing files stored on primary storage. Thus, accessing offloaded data in an HSM system is typically non-transparent to the application or user because of the difference in access time. In addition, since HSM introduces a substantial time lag to access offloaded data, HSM systems typically only offload low access (essentially, no access) data.

A file system may be defined as a collection of files and file system metadata (e.g., directories and inodes) that, when set into a logical hierarchy, make up an organized, structured set of information. File systems may be mounted from a local system or remote system. File system software may include the system or application-level software that may be used to create, manage, and access file systems.

File system metadata may be defined as information file system software maintains on files stored in the file system. File system metadata may include definitions and descriptions of the data it references. Generally, file system metadata for a file includes path information for the file as seen from the application side and corresponding file system location information (e.g. device:block number(s)). File system metadata may itself be stored on a logical or physical device within a file system.

File systems may use data structures such as inodes to store file system metadata. An inode may be defined as a data structure holding information about files in a file system (e.g. a Unix file system). There is an inode for each file, and a file is uniquely identified by the file system on which it resides and its inode number on that system. An inode may include at least some of, but is not limited to, the following information: the device where the inode resides, locking information, mode and type of file, the number of links to the file, the owner's user and group IDs, the number of bytes in the file, access and modification times, the time the inode itself was last modified and the addresses of the file's blocks on disk (and/or pointers to indirect blocks that reference the file blocks).

When performing operations such as backup, periodic replication or certain batch jobs file system cloning or device level split mirrors are typically used to achieve a stable copy of the storage. This is primarily used with hardware arrays. Many software split mirror mechanisms support space saving implementations that do not have overhead for read-only data. However, hardware split mirrors typically do not support space saving implementations, or may have to do complex configuration steps even for space saving split mirrors.

SUMMARY

Embodiments of a system and method for performing operations in a multi-class file system without requiring split mirrors are described. A split mirror is a stable copy broken off from a mirror image. When performing some operations such as backup, periodic replication or certain batch jobs file system cloning or device level split mirrors are typically used to achieve a stable copy of the storage. Using a multi-class file system implemented by a multi-class storage mechanism to segregate data being written from data being read, such operations that normally use split mirrors may be performed without having to generate split mirrors for all the data.

A multi-class file system including a hierarchy of storage classes may be implemented on one or more storage devices. In one embodiment, the storage classes may be ordered in the hierarchy of storage classes according to performance characteristics from a highest storage class including one or more high-performance storage devices to a lowest storage class comprising one or more low-performance storage devices. In one embodiment, one or more of the storage classes may be write-locked storage classes for read-only data.

Actively written to files may be assigned and/or migrated to higher storage classes and read-only files may be assigned and/or migrated to write-locked lower storage classes in the hierarchy. In one embodiment, the file system may migrate portions of a file to different storage classes. For example, actively written records of a database file may be stored in a higher storage class of the multi-class file system, with inactive database records migrated to a write-locked lower storage class.

An operation that requires a stable copy of the storage classes may need to be performed, e.g. by the file system software or by an application using the multi-class file system. The operation may, for example, be an image backup, creating a second copy for doing testing or batch processing on a database, or any other operation that requires a stable copy. To perform the operation on a read-only storage class, a write lock of the storage class may be examined to determine if the write-locked storage class has been written to. If the write-locked storage class has not been written to, the operation may be performed on the write-locked storage class without generating a split mirror of the write-locked storage class. In one embodiment, the entity performing the operation may block the file system software from enabling the write-locked storage class for writing for the duration of the operation.

BRIEF DESCRIPTION OF THE DRAWINGS

The following detailed description makes reference to the accompanying drawings, which are now briefly described.

FIGS. 8A through 8D illustrate an exemplary metadata structure for data that may be modified during assignment and migration of data in a multi-class file system according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for implementing a file system across different classes of storage in a storage system are described. Embodiments may define multiple classes of storage and automatically and transparently migrate data between the storage classes within the same file system to meet the usage needs of the business. This data may be migrated as files or portions of files, and may include, but is not limited to, application data and/or file system metadata. Embodiments may be used to transparently adapt the cost of storage to the usage patterns of data on the storage, thereby reducing the amount that customers need to spend for their storage. In embodiments, storage devices may be classified into two or more different classes of storage to implement a multi-class file system. Embodiments may provide a multi-class storage mechanism for managing and implementing sets of user-defined policies for assigning and migrating data within the multi-class file system.

Figure 1:
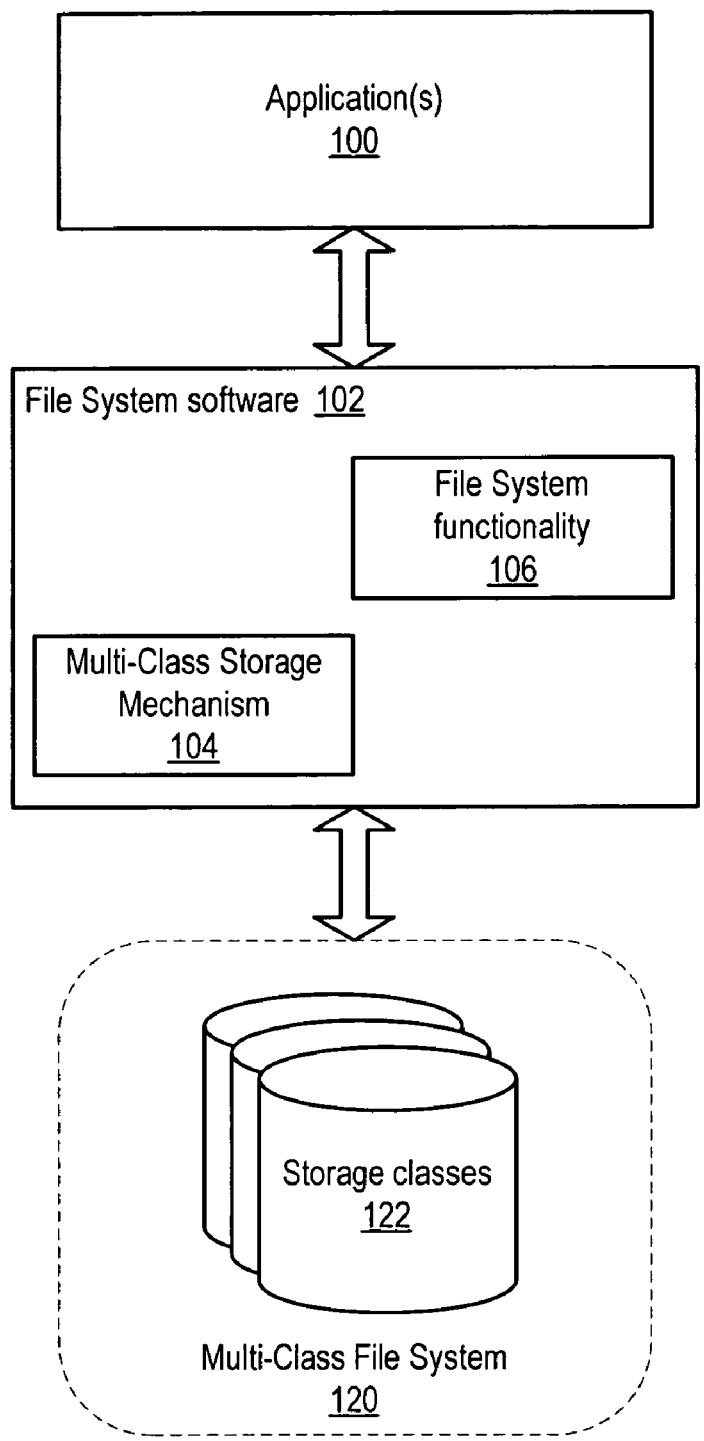
FIG. 1 illustrates file system software including a multi-class storage mechanism implementing a multi-class file system according to one embodiment.

FIG. 1 illustrates file system software including a multi-class storage mechanism implementing a multi-class file system according to one embodiment. File system software 102 may include, but is not limited to, an embodiment of the multi-class storage mechanism 104 and software that provides "traditional" File System functionality 106. File System functionality 106 may be provided by any of various File System implementations including, but not limited to, disk-based file systems such as Veritas' VxFS and UNIX File System (UFS), and networked file system such as Network File System (NFS) and AT&T's Remote File Share (RFS).

File system software 102 may implement, on one or more storage devices, a multi-class file system 120. In one embodiment, the software that provides the File System functionality 106 may be used to implement the multi-class file system 120, while the multi-class storage mechanism 104 manages the policies and performs assignment and migration of data within the multi-class file system 120 according to the policies. The multi-class file system 120 may include one or more physical and/or logical storage devices organized in a hierarchy of two or more storage classes 122 according to one or more characteristics of the storage devices and/or data requirements of the user(s) of the file system. The multi-class file system 120 is made available to the application(s) 100 as one file system. The storage classes 122 of the multi-class file system 120 are transparent to the application(s) 100.

In embodiments, the multi-class storage mechanism 104 may make an automatic and transparent determination on where to initially place a file (i.e., in which storage class 122) according to the policies. The multi-class storage mechanism 104 may later relocate or migrate the file (or a portion of the file) to another storage class 122 according to the policies. A migrated file remains online within the file system, even if the file is moved to the lowest storage class 122; migration does not move files to offline storage.

In a multi-class file system 120, the same file system has multiple storage classes 122. Each storage class 122 is part of a single overall file system. As far as the user or application is concerned, the files are stored in the same logical storage location within the file system (e.g. a directory or folder). It is transparent from the application and/or user's perspective whether a file is on one storage class 122 or another, or if parts of a file are on different storage classes 122. From the application and/or user's perspective, the file appears to be in the same location in the file system where the user put it. Migrated data remains in the file system no matter which storage class it is migrated to. Migrated data remains active or online in the file system, and does not have to be restored from offline storage media in order to be accessed.

In one embodiment, the number of storage classes 122 in a multi-class file system 120 is configurable—there may be 2 to N user-defined storage classes 122 in a multi-class file system 120. As an example, a three-class file system may be implemented, and a first portion of the data (e.g. 5%) may be classified as most active data and may be placed in a highest storage class, a second portion of the data (e.g. 15%) may be classified as less active data and may be placed in a middle storage class, and a third portion of the data (e.g. 80%) may be classified as least active (or inactive) data and may be placed in a lowest storage class (without offloading the data to tape or other media). Thus, embodiments may preferably reduce cost of overall storage without significantly impacting performance, robustness, etc.

In embodiments, there may be multiple devices in the same storage class 122. A storage class 122 may be based, for example, on cost/performance characteristics of the storage devices. A storage class 122 may, for example, include five different devices, which may or may not be the same make and model, but all the devices are considered in the same storage class 122. If a file is put on a storage class 122, it may be stored to any of the devices in the storage class 122 (or alternatively across two or more devices in the storage class 122). In one embodiment, portions of a file may be stored or migrated to devices in two or more storage classes 122. For example, one or more active records of a database may be stored in a higher storage class 122 including high-performance storage devices, while less or inactive records of the database may be stored in or migrated to lower storage classes 122 including lower-performance storage devices.

In embodiments, storage classes 122 may be defined (e.g. by a user or administrator) based on one or more characteristics including, but not limited to, performance and cost of the storage. Storage devices do not have to be exactly similar in characteristics to be placed in the same storage class 122, but it may be preferable to place storage devices that are similar in one or more primary characteristics together in the same storage class 122. For example, storage devices may be grouped into storage classes 122 according to performance characteristics, with the fastest storage devices placed in a first (highest) storage class 122, and slower storage devices placed in lower storage classes 122. For example, two or more fast mirrored storage devices (which may be different makes or models) may be grouped in a first storage class, two or more RAID-5 devices may (which may be different makes or models) be grouped in a second storage class, even slower storage devices (which may be different makes or models) may be placed in a third storage class, and so on.

Embodiments may allow a user to define as many storage classes 122 as desired or required and to separate the storage classes 122 according to any characteristics the user desires or requires. In one embodiment, a user may further segment a storage class 122 into two or more subclasses of storage as desired or required. As examples, a storage class 122 may be segmented into subclasses for two or more departments of an enterprise to separate the departments' data onto different storage devices within the storage class, or into subclasses containing frequently-read data and less-frequently-read data, or into subclasses containing frequently-written data and frequently-read data, or into subclasses containing frequently-written data and less-frequently-written data. In this embodiment, the policies maintained and implemented by the multi-class storage mechanism 104 may specify, at the storage class and/or subclass level, storage classes and/or subclasses of a storage class to which certain files or portions of files are to be assigned and/or migrated.

Embodiments may provide business-oriented hierarchical management of online storage. Rather than simply migrating data to lower classes of storage based on how recently or frequently the data are accessed, embodiments may make migration decisions within the multi-class file system 120 based on one or more of other business-oriented factors. Embodiments may organize and migrate data in a multi-class file system 120 using policies oriented towards the business value of the data. The business value may be based, for example, on the user, application, department, etc that originated, owns, or most frequently accesses the data, time criticality of the data, and/or time of the data in a business or application cycle. Embodiments may implement classes of storage and place data in the storage classes 122 according to the business-oriented policies. In embodiments, files or portions of files may be placed in a storage class 122 and/or migrated to different storage classes 122 according to usage parameters and/or business-oriented parameters such as how valuable and/or important the data is, as determined by the predefined policies for evaluating the parameters. Embodiments may apply policies about the value, importance, and usage of the data, or even other factors such as ownership of the data (e.g. what department or user owns and/or accesses the data), within the multi-class file system 120 to preferably provide a lower underlying hardware cost with essentially the same responsiveness.

Policies used by the multi-class storage mechanism 104 may be based on file type, users, location, department, application, importance, value, or other factors in addition to file size and usage. The factors that policies may evaluate may be factors that are important to a business such as how valuable, critical, or important the data is, and how critical the response time is. For example, the policies may specify that a set of business-critical data that may be infrequently accessed should remain in a highest storage class, and/or that another set of data that is not as critical may be stored or migrated to a lower storage class regardless of the data's frequency of access. The data in the lower storage classes or even the lowest storage class, still within the same file system, may be accessed without having to be restored to the file system from offline storage, and may be migrated to higher storage classes transparently to the application and/or user if the policies, applied by the multi-class storage mechanism 104, indicate that migration of the files is necessary or desired.

Implementation of the policies may be performed at allocation time and/or during use. The policies may be implemented within the File System software 102, eliminating a level of interruption.

Embodiments of the multi-class storage mechanism 104 may migrate data within the multi-class file system 120, no matter how busy the data is or whether the data is being used for read or write, if the policies indicate that the data is to be migrated. The multi-class storage mechanism 104 makes policy-based decisions about the importance, value, and/or usage of data and migrates the data to a storage class 122 with appropriate characteristics. The data remains online as part of the same file system, and the migration of the data is transparent to the user. Data, including application data and file system metadata, may be moved up or down in the multi-class file system 120 transparently to the user.

In one embodiment, the multi-class storage mechanism 104 may place or relocate parts of a file in different storage classes 122 according to the policies. For example, one part of a file that is frequently accessed may be placed in a higher storage class composed of faster storage devices, and another part of the file that is less frequently accessed may be migrated to a lower storage class composed of slower, less expensive storage devices. Data, including application data and file system metadata, remains active in the same file system regardless of which storage class 122 the files or parts of files containing the data are stored in or migrated to.

In one embodiment, file system metadata may be used to track the storage and migration of data in the multi-class file system 120. When a file or portion(s) of a file is stored in or migrated to a storage class, the file system metadata may be modified to indicate the location of the file or portion(s) of the file in the multi-class file system 120. From the application or user's perspective, the path to the file does not change when the metadata is modified to reflect migration of a file or portion of a file. The file system metadata may be stored and handled separately from other data or alternatively may be handled together with other data in a storage class 122 (typically, but not necessarily, at the highest storage class).

In one embodiment, to migrate a file or portion of a file, a range of blocks of the file may be locked while the blocks are being migrated. In one embodiment, the File System software 102 obtains a lock on the range of blocks, reads the data into system memory, writes the data out to the new storage class location, changes the mapping in the metadata, and unlocks the range of blocks. In other embodiments, ranges of blocks may be copied from one storage class location to another without being read into and written out of system memory. The range of blocks may be locked only for the time the data is being migrated. The rest of the blocks in the file remain unlocked during the migration of the range of blocks. In one embodiment, the number of blocks in a range that are locked and migrated at one time may be tuned for performance. The effects of the migration are transparent to any user of the data.

In one embodiment, to migrate a file or portion of a file, the file or portion of a file being migrated may not be locked during the transfer of the data. Instead, the data may be migrated to its new location, and the file or portion of a file may be locked only while updating the metadata. In one embodiment, an intelligent controller, array, or other mechanism may be used to migrate the data outside the host without going through system memory, without locking the file or portion of a file while the data is being transferred, and locking the file or portion of a file only while updating the metadata. In these embodiments, the file system software may need to check when it locks the file or portion of a file for the metadata update that no writes happened while the blocks were being copied. These embodiments lock the file or portion of a file for a shorter time than locking during the migration, so are less disruptive to file accesses. In one embodiment, if the file or portion of a file is being written, then a migration up for the written blocks may be performed by allocating a new set of blocks for the data being written and then directly writing them to the new disk location.

In one embodiment, a storage class 122 may be added to a multi-class file system 120 and data in files or portions of files, including application data and file system metadata, may be automatically and transparently moved to the new storage class. For example, if new, faster storage devices are available, one or more of the storage devices may be added to the multi-class file system 120 as a new, highest class of storage, and files or portions of files may be automatically migrated to the new, highest storage according to one or more policies. The same may be performed for intermediate or lowest classes of storage.

The capacity of storage classes may be increased or decreased if necessary or desired. In one embodiment, a storage class may be monitored for free space and automatically grown if necessary. In one embodiment, a storage device within a storage class may be grown to increase the capacity of the storage class. For example, a storage device with a total of 4 gigabytes of disk space may have 2 gigabytes of the disk space allocated to a storage class in a multi-class file system. If necessary or desired, free disk space on the storage device may be added to the storage class to grow the storage class. Data may be automatically and transparently moved to the newly allocated disk space on the storage device according to the policies. In one embodiment, one or more storage devices may be added to a storage class and data may be automatically and transparently moved to the new storage device according to the policies.

In one embodiment, the migration of data in a multi-class file system may be controlled by the type(s) of application data and/or file system metadata in the multi-class file system. In other words, data may be segregated in the hierarchy of storage classes according to its type. In one embodiment, file system metadata may be segregated into different storage classes based on the type of metadata and migrated between storage classes as can application data.

FIGS. 2 through 8D illustrate means for implementing a multi-class file system comprising a hierarchy of storage classes on a plurality of storage devices and means for assigning and migrating data to different storage classes in the hierarchy of storage classes according to a set of policies for the multi-class file system.

Figure 2:
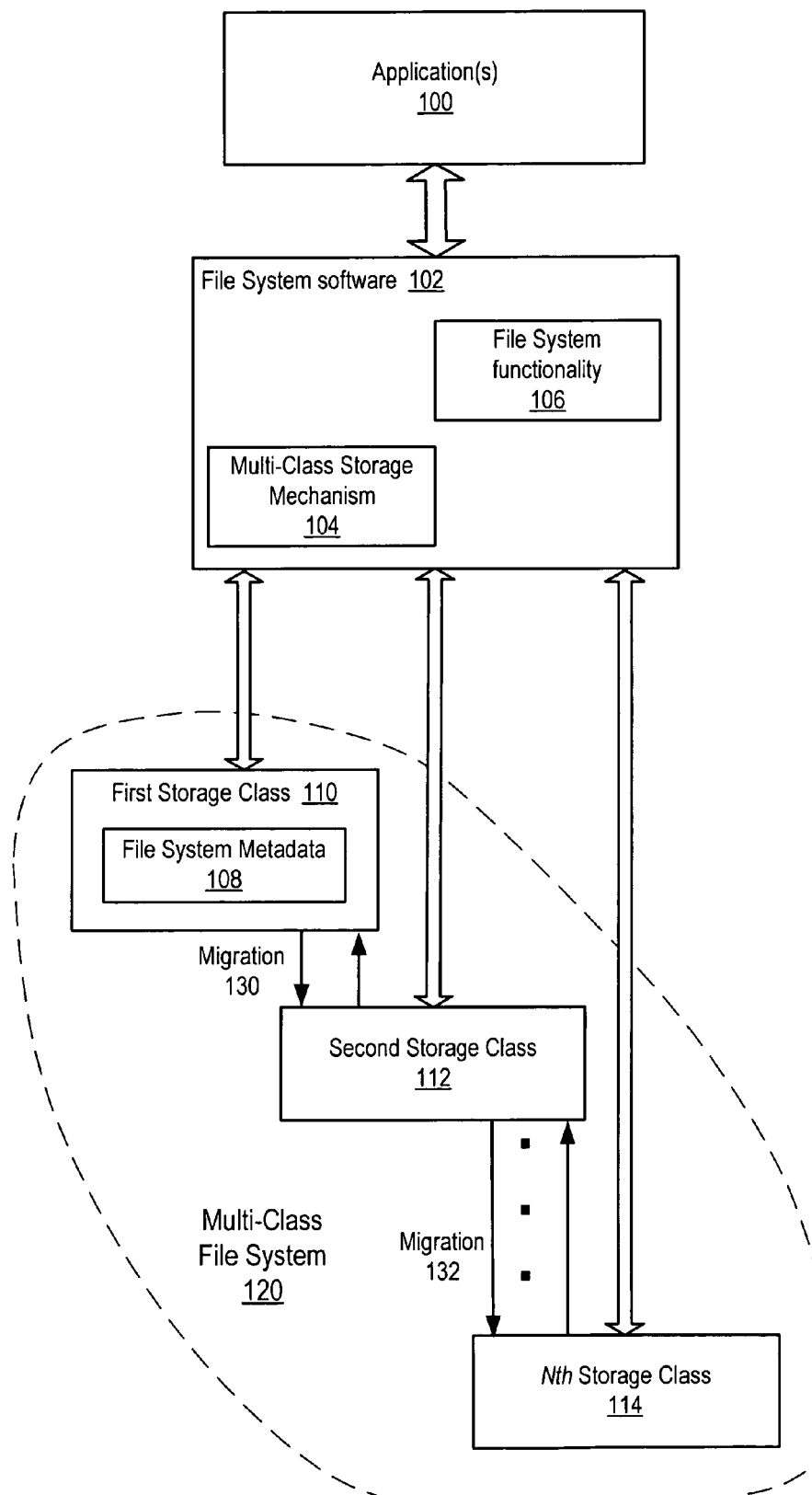
FIG. 2 illustrates file system software including a multi-class storage mechanism implementing a multi-class file system and assigning and migrating data within the file system according to one embodiment.

FIG. 2 illustrates file system software including a multi-class storage mechanism implementing a multi-class file system and assigning and migrating data within the file system according to one embodiment. File system software 102 may include, but is not limited to, an embodiment of the multi-class storage mechanism 104 and software that provides "traditional" File System functionality 106. File System functionality 106 may be provided by any of various File System implementations including, but not limited to, disk-based file systems such as Veritas' VxFS and UNIX File System (UFS), and networked file system such as Network File System (NFS) and AT&T's Remote File Share (RFS).

File system software 102 may implement, on one or more storage devices, a multi-class file system 120. In one embodiment, the software that provides the File System functionality 106 may be used to implement the multi-class file system 120, while the multi-class storage mechanism 104 manages the policies and performs assignment and migration of data within the multi-class file system 120 according to the policies. The multi-class file system 120 may include one or more physical and/or logical storage devices organized in a hierarchy of two or more storage classes according to one or more characteristics of the storage devices and/or data requirements of the user(s) of the file system. In this example, the multi-class file system 120 has N classes—a first storage class 110, a second storage class 112, and so on to an Nth storage class 114. The multi-class file system 120 is made available to the application(s) 100 as one file system. The storage class structure of the multi-class file system 120 is transparent to the application(s) 100.

In one embodiment, each storage class of the multi-class file system 120 may have different characteristics such as cost and/or geometry. In one embodiment, the storage classes may form a hierarchy, with the most expensive and typically fastest storage devices at the top, and the least expensive (and typically slower) storage devices at the bottom. The different storage classes may include heterogeneous storage devices to help achieve cost differences. For example, first storage class 110 may include one or more fast mirrored storage devices, second storage class 112 may include one or more RAID-5 storage devices, and a lowest storage class may include one or more read/write optical storage devices. In one embodiment, the amount of total storage at each storage class in the hierarchy may increase at each lower storage class of the hierarchy, though this is not required.

Note that, in some implementations, other criteria than cost and performance may be used to organize the storage devices into a hierarchy of storage classes. For example, storage capacity may be used as a criterion to select storage devices for a lower storage class. As another example, ownership or usage of the storage devices may be used as a criterion to place storage devices in storage classes. In this example, a storage device may be placed in a storage class based on the department or application that uses the storage device rather than on cost or performance characteristics of the storage device, and the policies may be implemented such that data belonging to that department or application is assigned to that storage device.

Multi-class storage mechanism 104 may store files, or portions of files, in storage classes of the multi-class file system 120 according to one or more user-defined policies geared to the business needs of the enterprise. Multi-class storage mechanism 104 may also migrate files and/or portions of files between storage classes in the multi-class file system 120 according to one or more user-defined policies. For example, as indicated at 130, files and/or portions of files may be migrated from first storage class 110 to second storage class 112, or from second storage class 112 to first storage class 110, according to the policies. As indicated at 132, files and/or portions of file may be migrated from second storage class 112 to lower storage classes in the multi-class file system 120 (e.g. the Nth storage class 114). The policies may be configured to move data up or down in the hierarchy of storage classes. In one embodiment, when data is reclassified to a lower or lowest storage class, the data may be compressed to further lower the cost of storage. Note that migrated files and/or portions of files remain in the same file system and are not migrated offline when migrated to any of the storage classes, even the lowest storage class. Also note that migration is performed transparently to the application(s) 100.

While FIG. 2 shows data migrating down from a higher storage class down to a next lower storage class, and data migrating up from a lower storage class to a next higher storage class, note that data may be migrated from any storage class to any other storage class in the hierarchy of storage classes according to the policies. For example, when migrating data down in the hierarchy of storage classes, some data may be migrated from the highest storage class to the next lower storage class, and other data may be migrated directly to the lowest storage class according to the policies. Similarly, when migrating data up in the hierarchy of storage classes, some data may be migrated from the lowest storage class to the next higher storage class, and other data may be migrated directly to the highest storage class according to the policies.

In one embodiment, the multi-class storage mechanism 104 may store new files in the multi-class file system at the highest or higher storage classes of the hierarchy. In one embodiment, as data ages (data including files and portions of files, e.g. a set of records in a database), the data may be moved down the hierarchy to lower-cost storage on lower storage classes to reduce the cost of storing the data. In one embodiment, data may be written into fast storage (e.g. fast mirrored storage) and then batched to slower storage such as RAID-5 storage, for example on a nightly schedule. Note that business-related attributes of the data such as importance, value, or ownership may be considered in decisions to assign and/or migrate the data. For example, a user may define the policies so that a file or portion of a file considered critical to business operations, and thus requiring fastest possible access times, may be kept in a highest storage class although access information may indicate that the file or portion of the file be migrated to a lower storage class. As another example, a user may define the policies so that a file or files, or portions of files, belonging to a certain group within the business may be kept in a higher storage class although access information may indicate that the file(s) or portions of file(s) be migrated to a lower storage class.

In one embodiment, when multi-class storage mechanism 104 migrates a file or portion of a file down to a lower storage class or up to a higher storage class in the multi-class file system, file system metadata 108 (e.g., inode information) is modified to reflect the move because the file or portion of a file is being moved to a different storage device. Note that file path information exposed to the application(s) 100 is not modified; the move is transparent to the application(s) 100. Also note that the moved data remains "on-line" in the multi-class file system 120, even when moved to the lowest storage class. The data is not moved "offline" and replaced by a stub (e.g. as in HSMs). Thus, the metadata (e.g., inode of the file) is modified to indicate the new location (e.g. device:block number(s) or device:extent(s)) of the data. If an application 100 requests the data, the data is still on-line in the file system, so it can be accessed directly without having to restore the data from offline storage. Thus, the structure of the multi-class file system 120 is transparent to application(s) 100 accessing the data stored in the multi-class file system 120. Regardless of where a file, block, or extent is stored in the multi-class file system 120, the file appears the same to the application(s) 100.

In one embodiment, the policies may be implemented to consider business criteria (e.g. value) and/or usage patterns of the data in making assignment and migration decisions. In one embodiment, the policies for classifying and migrating data in the hierarchy may be tailored to business needs to lower the total cost of the storage farm without compromising on performance or availability. There are many possible combinations of data usage and business criteria that may be implemented in the policies for use by the multi-class storage mechanism 104 in classifying data as to its initial storage class in multi-class file system 120 and in reclassifying and migrating data down to a lower storage class or up to a higher storage class in multi-class file system 120. The policies may make decisions according to the application, user, and/or business segment (e.g., department, division, etc) accessing or associated with the data, access patterns for the data, a specified policy (e.g. files in a particular directory or of a particular business group or employee could be assigned to high, medium, or low access classes), and/or any other desired parameter or parameters.

In one embodiment, multi-class storage mechanism 104 may track access of data, including application data and file system metadata, in files or portions of files, automatically downgrade at least a portion of the data on a storage class (e.g. at a time interval specified by a user or administrator) that has not been accessed for a given time interval, and migrate the downgraded data, in files or portions of files, to a lower storage class. In one embodiment, multi-class storage mechanism 104 may also be configured to migrate data on a storage class that has been accessed to a higher storage class. In one embodiment, a policy or policies may be operationally driven (e.g. to migrate data up to a higher class to do end-of-period processing, then back down when the processing is done).

One embodiment may break files down into smaller ranges of blocks or extents and keep statistics on the ranges (access times, usage characteristics, etc) to help make policy-based automatic decisions. The ranges of the files may then be separated on different classes according to the statistics as determined by the policies. For example, databases may have large files with high-priority and low-priority records mixed in. The files may be broken down into ranges that include high-priority or low-priority records, and statistics may be kept on the individual ranges. As another example, DB2 databases may have partitioned data based on certain indexes or fields in the database. Combinations of partitions may be created, and the DB2 database may be partitioned among classes of storage. This may be used, for example, in scaling clustering solutions.

Figure 3:
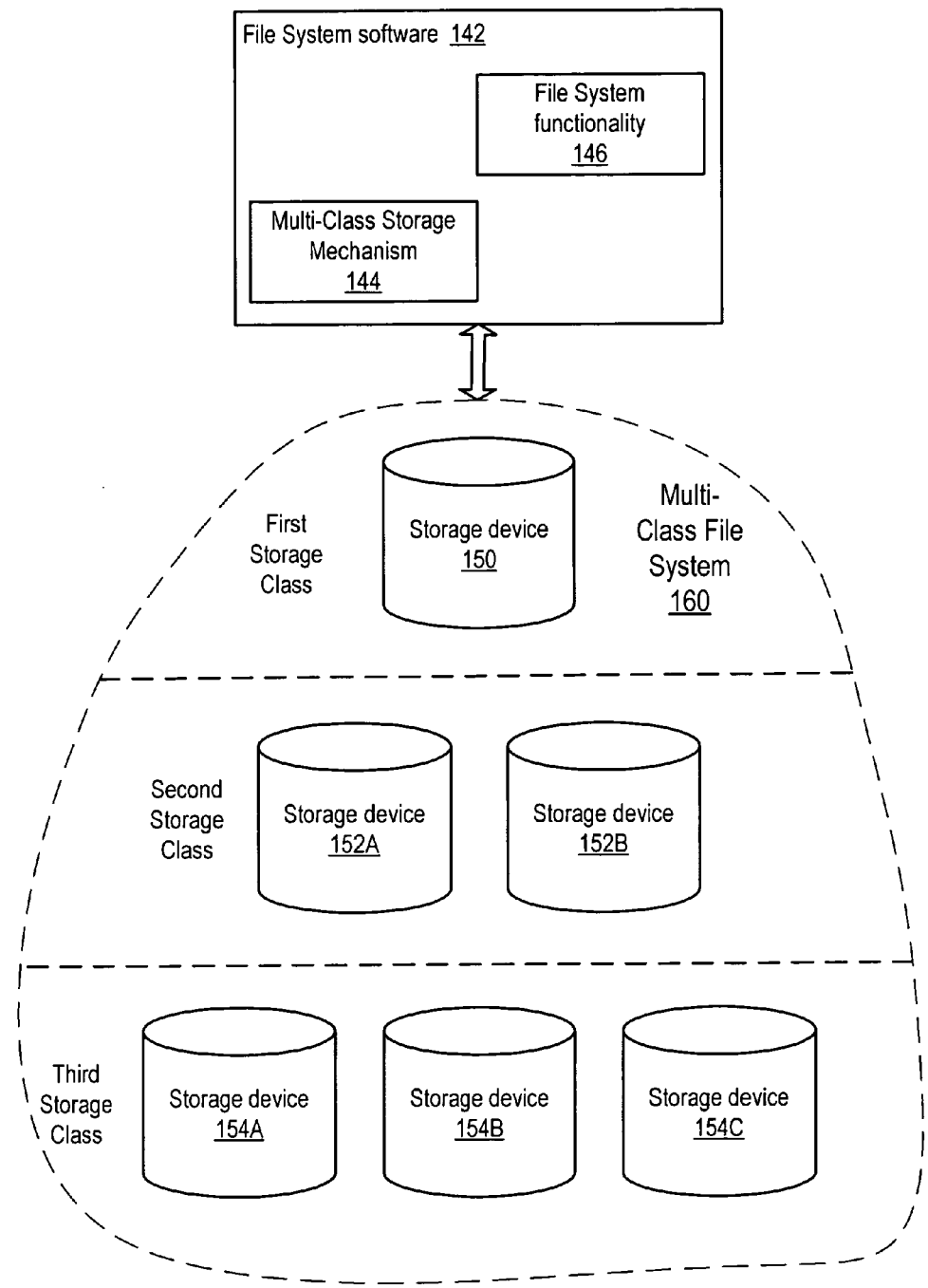
FIG. 3 illustrates a multi-class file system based on a multi-device feature of File System software according to one embodiment.

In one embodiment, the partitioning technique used to implement a multi-class file system may be a multi-device feature of a File System (represented as File System functionality 106 in FIG. 2). FIG. 3 illustrates a multi-class file system based on a multi-device feature of File System software according to one embodiment. File system software 142 may include, but is not limited to, an embodiment of the multi-class storage mechanism 144 and software that provides "traditional" File System functionality 146. File System functionality 146 may be provided by any of various File System implementations including, but not limited to, disk-based file systems such as Veritas' VxFS and UNIX File System (UFS), and networked file system such as Network File System (NFS) and AT&T's Remote File Share (RFS).

Each storage device in the multi-class file system 160 may be a logical or physical storage device. Typically, a physical device will be assigned to a particular class, but it is possible that two or more logical devices on one physical device may be allocated to different storage classes. The storage devices may be segmented into N storage classes in the multi-class file system 160 (in this example, three storage classes) by File System functionality 146. In this example, the first storage class includes storage device 150, the second storage class includes storage devices 152A and 152B, and the third storage class includes storage devices 154A, 154B, and 154C. Note that a storage class may include any number of individual storage devices.

The storage devices may be divided into storage classes by File System functionality 146 according to characteristics of the storage devices. In one embodiment, the storage classes may be arranged from a first storage class of highest-performing (and typically most expensive) storage devices, to a lowest storage class of poorest-performing (and typically least expensive) storage devices. There may be more storage devices per storage class in lower storage classes than in higher storage classes, but this is not required. The storage devices may be heterogeneous; that is, there may be different vendors and/or models of storage devices in the different storage classes, and there may be different vendors or models of storage devices within a storage class. In other words, storage devices may be grouped in a storage class and/or divided into different storage classes according to performance characteristics rather than make and model.

In one embodiment of the multi-device implementation, the file system software 142 may address each device as a range of blocks (e.g. from 0-$n$). In one embodiment, the multi-class file system may address a particular block in the file system as a device:block number, or alternatively device:extent, if extents are used. The device:block number may be associated with a path or directory in the file system metadata. The multi-class storage mechanism 144 tracks which storage devices are assigned to which storage classes. If the multi-class file system 144 moves a file or portion of a file to another storage device on another storage class, the file or portion of a file remains active in the file system, and the metadata is modified to reflect the move. The device:block number is changed, but the path or directory information remains the same. Thus, the move is transparent to an application that accesses the file.

A multi-class file system 160 based on a multi-device feature of a File System may be expanded. For example, storage devices may be added to the storage classes and/or additional storage classes may be added using the File System functionality 146, and the multi-class storage mechanism 144 may store or migrate files or portions of files to the new storage device(s) and/or storage class(es) automatically and transparently to the application(s) that access the multi-class file system 160. As another example, storage allocated to a storage class on a storage device within the storage class may be expanded to increase the size of the storage class.

Figure 4:
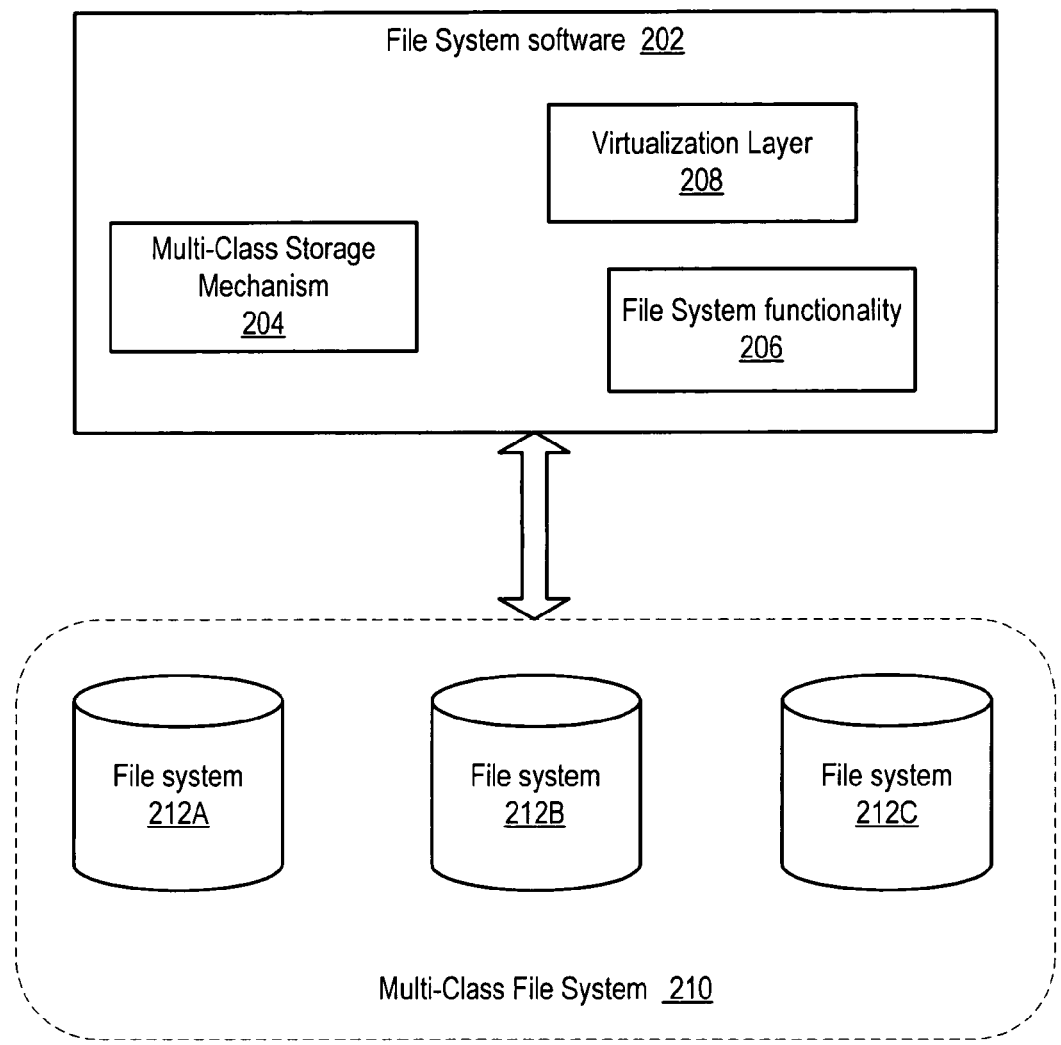
FIG. 4 illustrates a multi-class file system based on multiple independent file systems under a virtualization layer according to one embodiment.

In another embodiment, the partitioning technique used to implement a multi-class file system may be multiple independent file systems under a virtualization layer, as illustrated in FIG. 4. File system software 142 may include, but is not limited to, an embodiment of the multi-class storage mechanism 204, software that provides "traditional" File System functionality 206, and a virtualization layer 208. File System functionality 206 may be provided by any of various File System implementations including, but not limited to, disk-based file systems such as Veritas' VxFS and UNIX File System (UFS), and networked file system such as Network File System (NFS) and AT&T's Remote File Share (RFS).

File System functionality 206 may implement a plurality of separate file systems (e.g., file systems 212A, 212B, and 212C). Each file system 212 may be implemented to represent a class in a multi-class file system 210. For example, file system 212A may be a highest storage class, file system 212B may be a middle storage class, and file system 212C may be a lowest storage class. Each file system 212 may be implemented on a separate storage device, or alternatively one or more of the file systems 212 may logically extend across two or more storage devices. Each file system 212 may have its own file system metadata. Virtualization layer 208 may be used to map these file systems 212 to a single file system and present the single file system to one or more application(s). Virtualization layer 208 maintains some form of metadata for the single file system that maps data paths as used by application(s) to data locations in the file systems 212.

Multi-class storage mechanism 204 maintains and implements the user-defined policies of the multi-class file system 210. Multi-class file system 210 may initially assign files or portions of files to storage classes (i.e., file systems) based on the policies, and may monitor file usage and migrate files or portions of files up or down in the storage classes according to the policies (in this example, the three storage classes represented by file system 212A, file system 212B, and file system 212C). To assign or migrate a file or a portion of a file, multi-class file system 210 may interact with File System functionality 206 to actually move the file from one file system 212 to another (including modifying the metadata on the affected file systems 212), and with virtualization layer 208 to modify the metadata for the single file system presented to the application(s) to reflect the move. Alternatively, File System functionality 206 may interact with virtualization layer 208 to modify the metadata for the single file system presented to the application(s) to reflect the move. In the metadata for the single file system presented to the application(s), the path information is not modified when a file or portion of a file is migrated. Further, the file or portion of a file remains within the single file system presented to the applications(s) by the virtualization layer 208, and within the file systems 212, and is not moved offline. Thus, the multi-class file system 210, and migration of data within the multi-class file system 210, remains transparent to the application(s). All the application(s) see, or need to see, is the single file system presented by the virtualization layer 208.

In yet another embodiment, the partitioning technique used to implement a multi-class file system may be block ranges with different characteristics. The block ranges may be implemented by either the software that provides file system functionality (e.g., Veritas' VxFS) or in the underlying volume manager or disk subsystem(s). In this embodiment, sets of characteristics may be assigned to different ranges of blocks. In the multi-device implementation, the file system software may address each device as a block range (e.g. from 0-$n$), and addresses one particular block in the file system as device:block number. In the block range implementation, the device may be made the high-order bits of the block number, and the concatenated block numbers, separated into ranges representing storage classes, may be used to implement the multi-class file system. Thus, a block range may extend across one or more devices. In this implementation, one virtual device may be presented to the application with distinctly different characteristics associated with block ranges of the virtual device, with the file system software understanding what block ranges of the file system have those characteristics.

The multi-class storage mechanism maintains and implements the user-defined policies of a multi-class file system implemented using block ranges as storage classes. The multi-class file system may initially assign files or portions of files to storage classes (block ranges) based on the policies, and may monitor file usage and migrate files or portions of files up or down in the storage classes according to the policies. To assign or migrate a file or a portion of a file, the multi-class file system may interact with the software that provides File System functionality to actually move the file from one block range to another (including modifying the metadata to reflect the move). In the metadata, the path information is not modified when a file or portion of a file is migrated. Further, the file or portion of a file remains within the file system presented to the applications(s), and is not moved offline. Thus, the multi-class file system, and migration of data within the multi-class file system, remains transparent to the application(s).

Note that other techniques to partition storage devices into storage classes than those described herein may be used in other embodiments. Embodiments of the multi-class storage mechanism may function transparently to the particular underlying partitioning technique used to organize storage devices or file systems into a multi-class file system.

Figure 5:
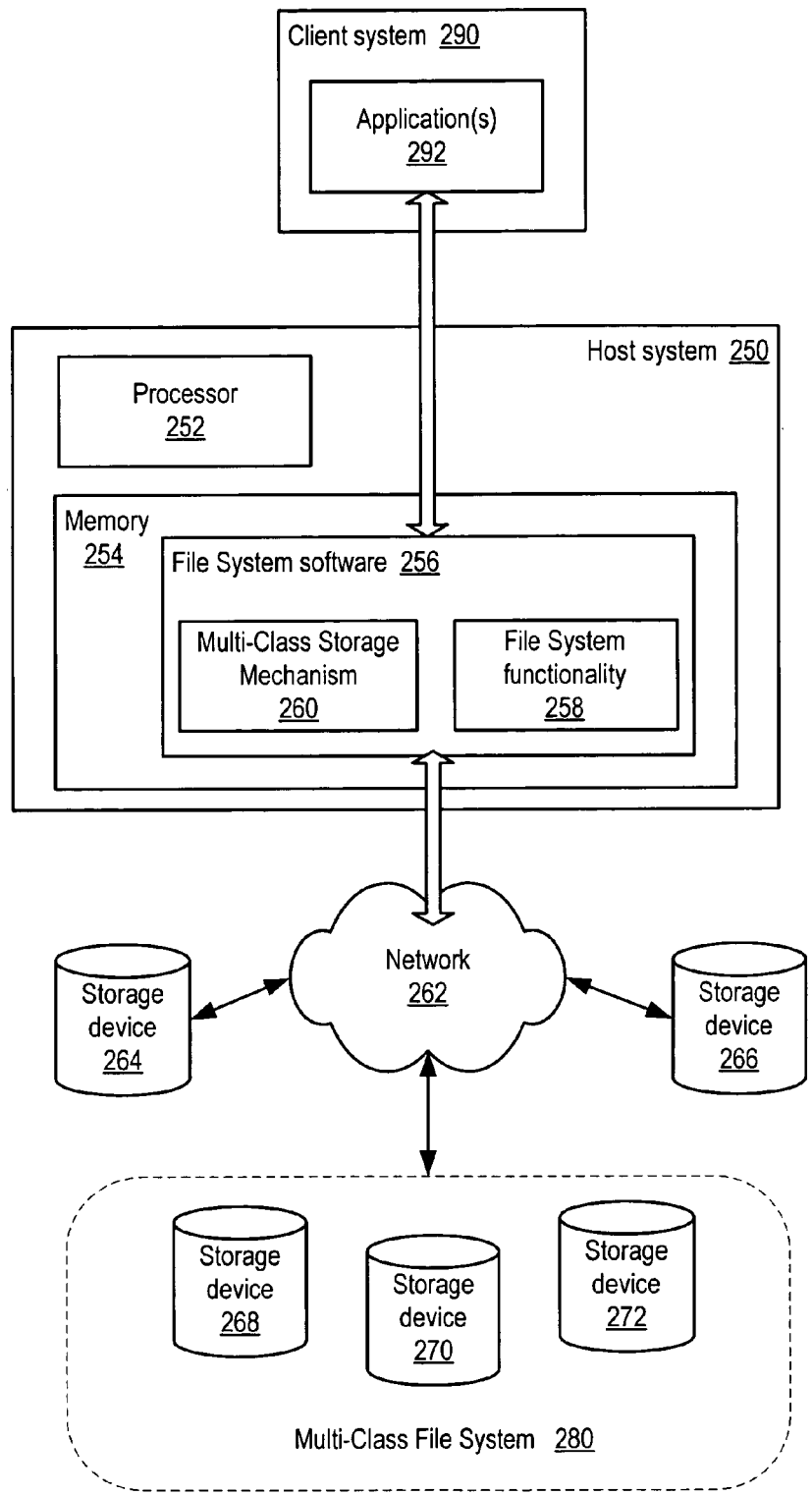
FIG. 5 illustrates a multi-class file system in a network storage environment according to one embodiment.

FIG. 5 illustrates a multi-class file system in a network storage environment according to one embodiment. Host system 250 may be any of various types of devices, including, but not limited to, a personal computer system, desktop computer, laptop or notebook computer, mainframe computer system, workstation, network computer, or other suitable device. Host system 250 may include at least one processor 252. The processor 252 may be coupled to a memory 254. Memory 254 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. Host system 250 may couple, for example over a wired or wireless network or networks, to one or more other devices, e.g. client system 290, via one or more wired or wireless network interfaces. Host system 250 may couple over a network 262 to two or more storage devices, in this example storage devices 264, 266, 268, 270 and 272. Network 262 may, for example, be a Storage Area Network (SAN), a LAN with Network-Attached Storage (NAS), or any network capable of coupling storage devices to a host system 250. The storage devices may include any of one or more types of storage devices including, but not limited to, storage systems such as RAID (Redundant Array of Independent Disks) systems, disk arrays, JBODs (Just a Bunch Of Disks, used to refer to disk cabinets that do not have a built-in RAID controller), tape devices, and optical storage devices.

Host system 250 may include, in memory 254, file system software 256. File system software 256 may include, but is not limited to, an embodiment of the multi-class storage mechanism 260 and software that provides "traditional" File System functionality 258. File System functionality 258 may be provided by any of various File System implementations including, but not limited to, disk-based file systems such as Veritas' VxFS and UNIX File System (UFS), and networked file system such as Network File System (NFS) and AT&T's Remote File Share (RFS). In one embodiment, file system software 256 may also include a virtualization layer (not shown) that may be used to map file systems on the storage devices to a single file system and to present the single file system to one or more application(s).

File System functionality 258 of file system software 256 may implement, on one or more of the storage devices, a multi-class file system 280 (in this example, on storage devices 268, 270, and 272). One of the methods for implementing a multi-class file system previously described may be used. In one embodiment, the software that provides the File System functionality 258 may be used to implement the multi-class file system 280, while the multi-class storage mechanism 260 manages the policies and directs assignment and migration of data within the multi-class file system 280 according to the user-defined policies.

The multi-class file system 280 may include one or more physical and/or logical storage devices organized in a hierarchy of two or more storage classes according to one or more characteristics of the storage devices and/or data requirements of the user(s) of the file system. For example, the multi-class file system 280 may have three classes—a first storage class on storage device 268, a second storage class on storage device 270, and a third storage class on storage device 272. As another example, storage device 268 may be a first storage class, and storage devices 270 and 272 may both be included in a second storage class. The multi-class file system 280 is made available to the application(s) 292 on client system 290 as one file system. The structure of the multi-class file system, and assignment and migration of data within the multi-class file system, are transparent to the application(s) 292.

In one embodiment, each storage class of the multi-class file system 280 may have different characteristics such as cost and/or geometry. In one embodiment, the storage classes may form a hierarchy, with the most expensive and typically fastest storage devices in the top or first storage class, and the least expensive (and typically slower) storage devices in the bottom or last storage class.

Figure 6:
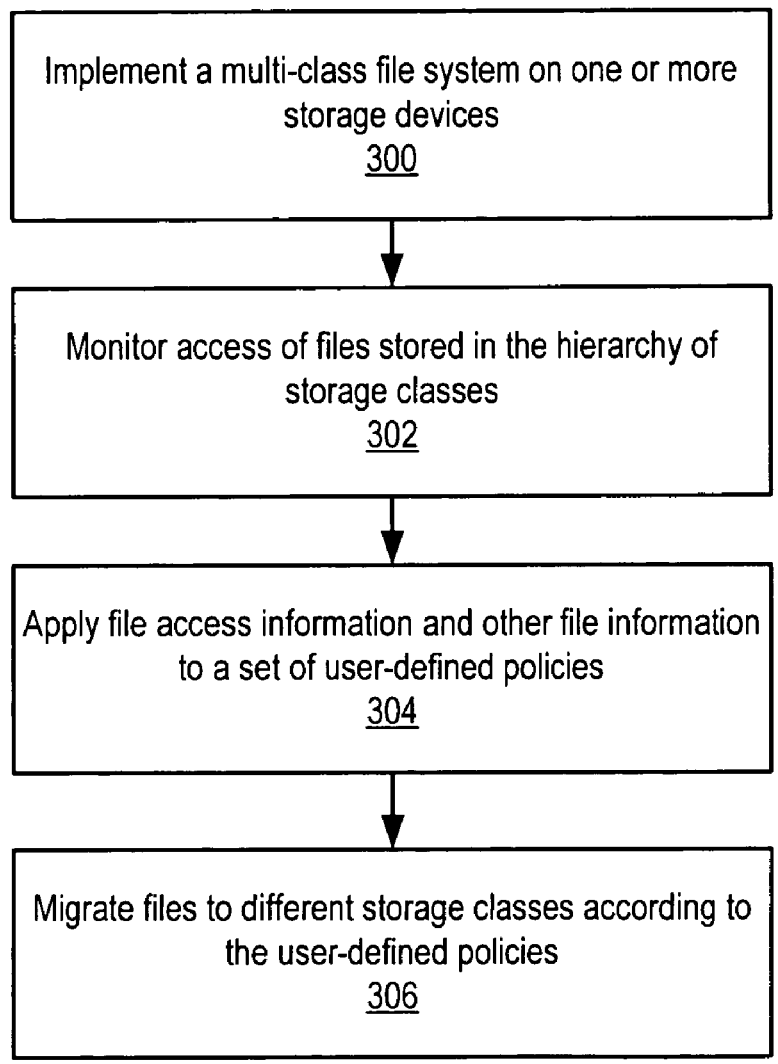
FIG. 6 is a flowchart of a method for assigning and migrating files or portions of files in a multi-class file system according to one embodiment.

FIG. 6 is a flowchart of a method for assigning and migrating files or portions of files in a multi-class file system according to one embodiment. As indicated at 300, a multi-class file system including a hierarchy of storage classes may be implemented on one or more storage devices. In one embodiment, a multi-device feature of file system software (e.g. Veritas' VxFS) may be used to implement the multi-class file system. Different architectures for the underlying structure of the multi-class file system were previously described. In one embodiment, each storage class includes one or more storage devices assigned to the storage class according to one or more characteristics of the storage class, e.g. performance characteristics. In one embodiment, the storage classes may be ordered in the hierarchy of storage classes according to performance characteristics from a highest storage class including one or more high-performance storage devices to a lowest storage class comprising one or more low-performance storage devices.

In one embodiment, a multi-class storage mechanism of the file system software may initially place files in the storage classes in the hierarchy of storage classes according to a user-defined policy for assigning new files to an initial storage class in the hierarchy of storage classes.

As indicated at 302, the multi-class storage mechanism of the file system software may monitor access of files stored in the hierarchy of storage classes to generate access information for the files. As indicated at 304, the multi-class storage mechanism software may apply the access information and other information about the file (e.g. ownership of the file, business value or importance of the file, etc.) to a set of user-defined policies for initially assigning and migrating files in the hierarchy of storage classes.

As indicated at 306, the multi-class storage mechanism of the file system software may migrate one or more of the files to different storage classes in the hierarchy of storage classes according to the set of user-defined policies when applied to the access or other file information. In one embodiment, less-frequently-accessed files may be migrated to lower storage classes including lower-performing storage devices, and more-frequently-accessed files may be migrated to higher storage classes including higher-performing storage devices. In one embodiment, files migrated to one or more storage classes in the hierarchy of storage classes, for example to the lowest class, may be compressed. In one embodiment, the multi-class storage mechanism software may modify file system metadata when a file is assigned or migrated to indicate the storage class for the file. In embodiments, migrating files to different storage classes may be performed transparently to an application that accesses the files in the hierarchy of storage classes. Note that files migrated to a lowest storage class remain online in the file system, i.e. the data is still present in the file system and is not moved offline.

In one embodiment, the multi-class storage mechanism software may assign or migrate a portion of a file (e.g. a range of blocks or sectors) to one storage class in the hierarchy of storage classes while assigning or leaving the remainder of the file on a different storage class according to the user-defined policies for assigning or migrating files.

In one embodiment, a new storage class may be added to the hierarchy of storage classes, and the multi-class storage mechanism software may transparently migrate one or more of the files or portions of the files from one or more others of the storage classes to the new storage class according to the policies. Storage classes may be increased or decreased in capacity if necessary or desired. In one embodiment, one or more storage devices may be added to a storage class and data may be automatically and transparently moved to the new storage device according to the policies. In one embodiment, a storage device within a storage class may be grown to increase the capacity of the storage class. If necessary or desired, free disk space on a storage device may be added to the storage class to grow the storage class. Data may be automatically and transparently moved to the newly allocated disk space on the storage device according to the policies.

FIGS. 7A through 7E illustrate the migration process in an exemplary multi-class file system with three storage classes according to one embodiment. In this example, file system software may include a multi-class storage mechanism as previously described. The file system software may, as previously described, implement a multi-class file system 240 including a hierarchy of storage classes on one or more storage devices; in this example there are three storage classes 220, 222, and 224, each of which may include one or more storage devices. Note that other multi-class file systems may have different numbers of storage classes. Also note that the term "data" as used in this example indicates a file or a portion of a file (e.g., a range of blocks or one or more extents).

The multi-class storage mechanism may maintain a set of policies for data assignment and migration within the multi-class file system, may monitor data accesses within the multi-class file system, and may cause data being monitored to be assigned to storage classes and/or migrated to different storage classes within the multi-class file system according to the set of policies. In this example, first storage class 220 may be mirrored on one or more high speed disks, and actively written data may be assigned or migrated there according to the policies. Data that have not been written to for some period (e.g. in the last month) are migrated to the second storage class 222 according to the policies, and data that have not been written to for some period (e.g. in the last quarter) are migrated to the third storage class 224 according to the policies. The second storage class 222 and third storage class 224 may each include one or more storage devices, which may be less expensive and slower than the storage device(s) of the first storage class (e.g. RAID-5 array(s)); the third storage class 224 may include one or more less expensive, and slower, storage devices than the storage device(s) of the second storage class 222. If data in the second storage class 222 or third storage class 224 is written to, it may be migrated back to the first storage class 220 according to the policies.

FIGS. 8A through 8D illustrate an exemplary metadata structure for data 230 of FIGS. 7A-7D that may be modified by the file system software during assignment and migration of data 230 in multi-class file system 240 according to one embodiment. As the migration process is described using FIGS. 7A-7E, FIGS. 8A-8D will be referenced to indicate modifications in the metadata to reflect the migration(s).

Figure 7A:
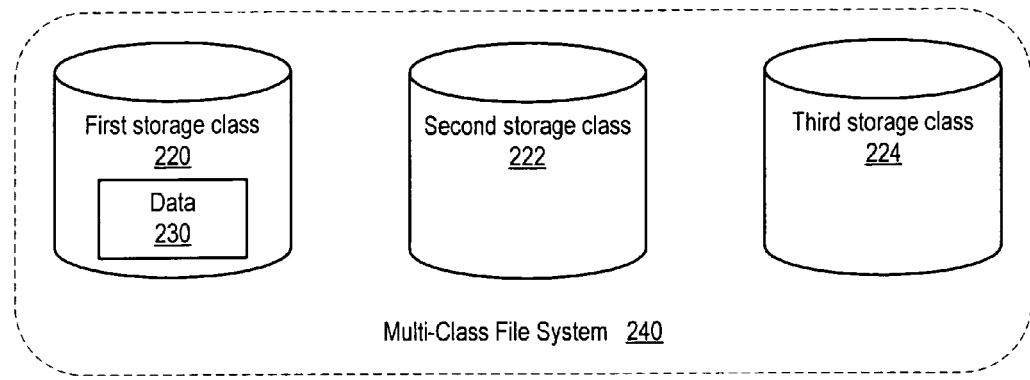
FIGS. 7A through 7E illustrate the migration process in an exemplary multi-class file system with three storage classes according to one embodiment.

As illustrated in FIG. 7A, data 230 may initially be written to first storage class 220 of multi-class file system 240. Data 230 may be a file or a portion of a file (e.g. one or more records of a database file, a range of blocks, or one or more extents of a file). The data may have been generated by some application using the multi-class file system 240. From the application's perspective, the data 230 was created at some logical location in the file system as seen by the application indicated to the application by a path. For example, a path to data 230 may look something like "MyDrive/MyFolder/MyFile" Note that this example is exemplary and is not intended to be limiting; other methods for indicating a path to data in a file system are possible.

FIG. 8A illustrates metadata for data 230 when assigned to first storage class 220. When data 230 is assigned to the first storage class 220, the data 230 is written to a block range on a storage device in the first storage class 220. In this illustration, the path as seen by the application is shown on the left, and the location information for the data 230 in the multi-class file system 240 as used by the file system software is shown on the right. The location information for the data 230 in the multi-class file system 240 indicates that the data 230 is located at "First Storage Class:Device:Block Number". Note that this example is exemplary and is not intended to be limiting; other methods for storing location information for data in a multi-class file system are possible. For example, an alternative is to simply indicate the device and block number, as the storage class may be determined from the device identifier. Another alternative is to concatenate the device identifier and block number (as is done in embodiments where the underlying implementation of the multi-class file system uses block ranges as storage classes, as previously described). Also note that the metadata may include other information not shown, such as the number of blocks the data 230 occupies starting at the indicated block number.

Figure 7B:
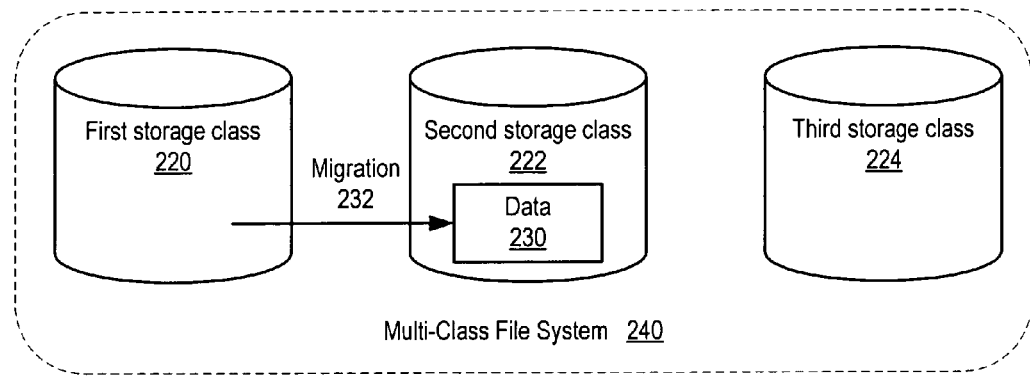

As illustrated in FIG. 7B, at some point migration 232 of data 230 from first storage class 220 to second storage class 222 may occur. For example, the multi-class storage mechanism may monitor (read and/or write) access of data on first storage class 220, and periodically migrate data that has not been accessed for a period of time (e.g. one month) to second storage class 222 according to the policies. In this example, after data 230 is initially assigned to first storage class 220, the multi-class storage mechanism may monitor access of data 230 and, if the data has not been accessed for a period of time as specified by the policies, may migrate data 230 to second storage class 222. The migration 232 does not move data 230 offline; data 230 remains online within the file system. Note that the policies may include other criteria than simply access criteria to determine when and if data is to be migrated. For example, the policy may indicate that data 230 is critical to business operations, or is owned by a particular user or application, and is therefore not to be migrated. As another example, the policy may specify that all actively accessed data is to be stored on first storage class 220 and migrated to second storage class 222 after a month of inactivity except data that belongs to a particular non-critical application, which is to be migrated to second storage class 222 after one week of inactivity. Using the policies, other criteria, including business-related criteria, than simply data access criteria may be applied by the multi-class storage mechanism in making assignment and migration decisions.

FIG. 8B illustrates the metadata for data 230 after migration 232 to second storage class 222. Note that the location information for the data 230 in the multi-class file system 240 used by the file system software now indicates that data 230 is stored starting at a block number on a device of the second storage class 222. Also note that the path as seen by the application has not changed; from the application's perspective, migration 232 is transparent. The migration 232 does not move data 230 offline; data 230 remains online within the file system.

Figure 7C:
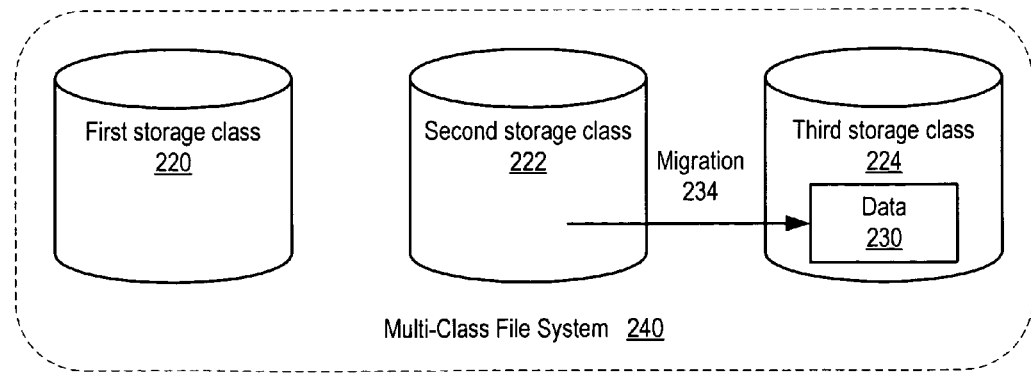

As illustrated in FIG. 7C, at some point migration 234 of data 230 from second storage class 222 to the third storage class 224 may occur. For example, the multi-class storage mechanism may monitor (read and/or write) access of data on the second storage class 222, and periodically migrate data that has not been accessed for a period of time (e.g. three months) to third storage class 224 according to the policies. In this example, after data 230 has migrated to second storage class 222, the multi-class storage mechanism may monitor access of data 230 and, if the data has not been accessed for a period of time as specified by the policies, may migrate data 230 to third storage class 224. The migration 234 does not move data 230 offline; data 230 remains online within the file system. Note that the policies may include other criteria than simply access criteria to determine when and if data is to be migrated. Using the policies, other criteria, including business-related criteria, than simply data access criteria may be applied by the multi-class storage mechanism in making assignment and migration decisions.

FIG. 8C illustrates the metadata for data 230 after migration 234 to third storage class 224. Note that the location information for the data 230 in the multi-class file system 240 used by the file system software now indicates that data 230 is stored starting at a block number on a device of the third storage class 224. Also note that the path as seen by the application has not changed; from the application's perspective, migration 234 is transparent. The migration 234 does not move data 230 offline; data 230 remains online within the file system.

While FIGS. 7A-7C show data migrating from a higher storage class down to a next lower storage class, note that data may be migrated from any storage class to any other storage class in the hierarchy of storage classes according to the policies. For example, when migrating data down in the hierarchy of storage classes, some data may be migrated from the highest storage class to the next lower storage class, and other data may be migrated directly to the lowest storage class according to the policies.

Figure 7D:
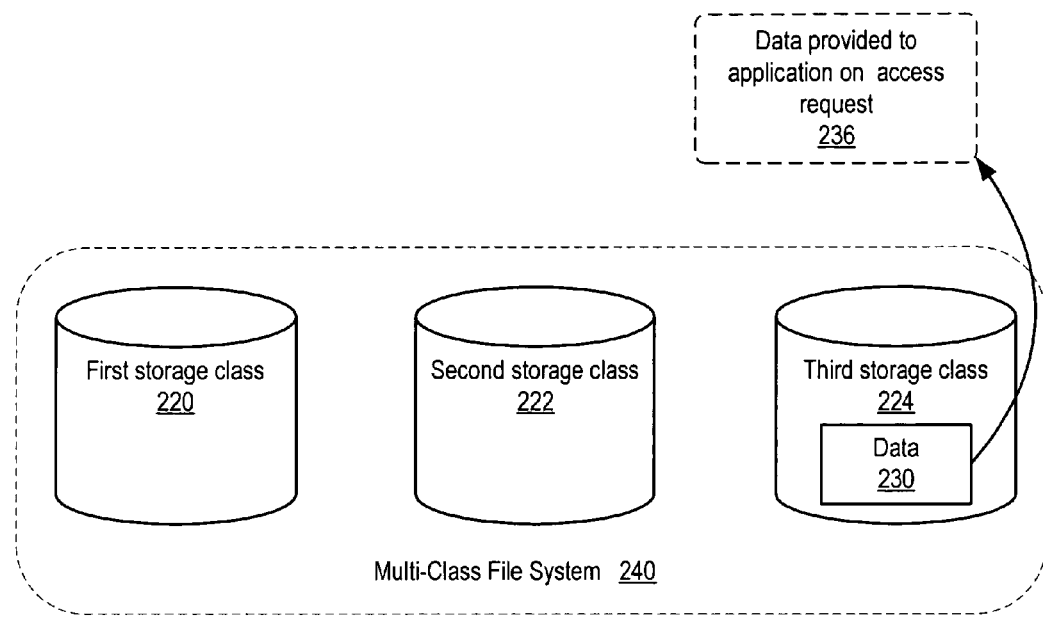
Figure 7E:
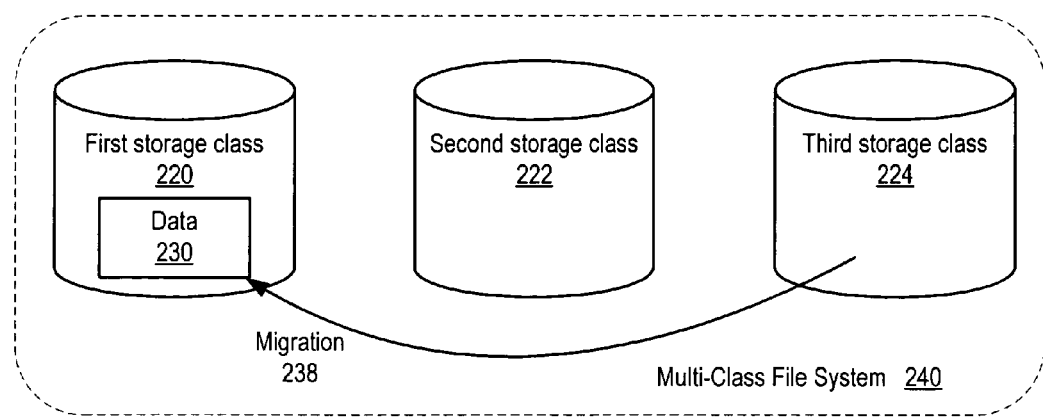

FIGS. 7D and 7E illustrate an exemplary method of handling of an access of data 230 on third storage class 224 according to one embodiment. At some point after migration 234 of data 230 to third storage class 224, an application may generate an access request (e.g. a read or write request) for the data 230. In FIG. 7D, the file system software may provide data 230 to the application to satisfy the access request, as indicated at 236. The policies may indicate to the multi-class storage mechanism that data stored on third storage class 224 is to be migrated to first storage class 220 if the data is accessed. In FIG. 7E, the multi-class storage mechanism may migrate 238 data 230 from third storage class 224 to first storage class 220 in response to the access of data 230 by the application if so indicated by the policies. The migration 238 does not have to restore data 230 from offline storage back into the file system; data 230 was online within the file system prior to the migration 238.

Note that, alternatively, data 230 may be migrated 238 to first storage class 220 prior to providing the data 230 to the application as indicated at 236. Also note that the policies used by the multi-class storage mechanism to make migration decisions may indicate some other action, which may be determined using other criteria than simply data access criteria, than migration to first storage class 220 upon access of data 230 is to be performed. For example, the policies may indicate that, if the access is a write access, data 230 is to be migrated to first storage class 220, but if the access is a read access, data 230 is to remain on third storage class 224. As another example, the policies may indicate that an access of data 230 by a particular application (or user) does not require data 230 to be migrated, but access by another application (or user) does require data 230 to be migrated.

While FIGS. 7D and 7E show data migrating up from a lowest storage class to a the highest storage class, note that data may be migrated from any storage class to any other storage class in the hierarchy of storage classes according to the policies. For example, when migrating data up in the hierarchy of storage classes, some data may be migrated from the lowest storage class to the next higher storage class, and other data may be migrated directly to the highest storage class according to the policies.

FIG. 8D illustrates the metadata for data 230 after migration 238 to first storage class 220 from third storage class 224. Note that the location information for the data 230 in the multi-class file system 240 used by the file system software now indicates that data 230 is stored starting at a block number on a device of the first storage class 220. Note that the device is not necessarily the same device as in the metadata of FIG. 8A, and the block number is not necessarily the same block number as in the metadata of FIG. 8A. Also note that the path as seen by the application has not changed; from the application's perspective, migration 238 is transparent.

One embodiment may include one or more storage classes of writeable storage and one or more storage classes that are not writeable (read-only). Note that, in one embodiment, storage devices within a storage class may be segmented into subclasses of writeable and read-only storage devices. Files may be migrated down to a read-only storage class, but the read-only storage class is only written to during migration. Thus, there may be one or more read-only storage classes in a multi-class file system. To write to one of the files in a read-only storage class, the file may first be migrated up to a writeable storage class to be written to. The file may remain in the higher storage class for a period until the multi-class storage mechanism determines that the file may be migrated back to the read-only storage class, or alternatively may be immediately migrated back to the read-only storage class, according to the policies.

In one embodiment, it may not be necessary to migrate an entire file because the file mapping in the file system may be implemented so that the blocks or sectors of the file that have not been modified may remain on a read-only storage class and the blocks or sectors that are to be modified are migrated to a writeable storage class according to the policies. Thus, parts of files as well as entire files may be migrated, and different blocks or sectors of a file may concurrently reside on different storage classes. To write to a file on a read-only storage class, blocks, sectors or records (in a database) that need to be modified may be migrated to a writeable storage class while the rest of the file stays on the read-only storage class.

The ability to migrate a portion of a file may be an important feature for databases, as an example. Once completed, a transaction in a database is typically not modified again. All transactions that have not been completed yet may reside in a writeable storage class. Periodically, completed transactions may be migrated to a read-only storage class (the database application may still need to access the transactions, so keeping them available is preferable). Inactive or completed records in a database may be migrated down to a read-only storage class while records that are still active are maintained in a writeable storage class according to the policies.

In one embodiment, a multi-class file system may include one or more levels of general storage classes, with one or more storage classes in each general storage class. A general storage class, like a storage class, may be based, for example, on cost/performance characteristics of the storage devices. Two or more storage classes in a general storage class may be considered at the same level in the hierarchy of storage classes. Data may be stored on or migrated to different classes of storage within a more general storage class according to the policies. For example, a general read-only storage class may include a storage class for actively accessed read-only data and a storage class for non- (or rarely-) accessed read-only data, the latter of which may be compressed. As another example, a general writeable storage class may include two or more classes based on criteria such as frequency of access. Note that other criteria than frequency of access may be applied to segment data within storage classes in a general storage class. As an example, importance of the data may be used as a criterion; some data within a general storage class may be deemed more important or critical than other data, and thus may be segmented from the less important data by storing the different data on different storage classes within the general storage class.

Using Compression in a Multi-Class File System

Embodiments may use compression to achieve further data storage efficiency in a multi-class file system. In a multi-class file system, there may be one or more classes of storage that contain files or blocks that are not actively written. By compressing these files (or blocks), a significant amount of disk space may be saved. One embodiment may compress all files or ranges of blocks migrated to a lower or lowest storage class. Rather than compressing all the files or blocks in a storage class, another embodiment may gather usage statistics for files or blocks in a storage class or storage classes and compress files (or, alternatively, ranges of blocks) in the storage class that are less frequently accessed.

Since it is known that the files or block ranges to be compressed are not being actively written, the file system may choose a compression algorithm that provides better space savings at the expense of not being able to do efficient in-place updates. In one embodiment, data in older (lower) storage classes may be compressed.

One embodiment may keep statistics on file usage and compress less-used (below some usage threshold) files and/or ranges of blocks. This may save disk space without the processing cost of decompressing when a file is read. One embodiment may perform the compression when migrating to a lower storage class for inactive files, as the file system has had time to gather statistics on the file access patterns. This may be used to implement only changing data on the lower storage classes at fixed times.

In one embodiment, when migrating data in files or portions of files to a lower storage class, the data may be compressed. One of the characteristics of files that may be examined by a policy-driven multi-class storage mechanism is files that have not been written to for some period. A typical problem with compression in file systems is that, when a file is to be compressed, it is not known in advance exactly how much compression will be achieved. A file is essentially random-access; if one byte or block in the middle of a compressed file is changed (typically by decompressing the file, changing the byte, and recompressing the file), the change to the byte or block may potentially change the compression size. For an uncompressed file, rewriting one block does not change the file size. If a compressed file is changed, recompressing the file might not leave enough space for the file, as the recompressed file may be larger than the original compressed files.

In one embodiment, files that have not been modified for a period (e.g. a month) may be migrated to a lower storage class. Files from that storage class may be migrated to an even lower storage class if the files are not modified for another, longer period (e.g. six months). The files may be compressed when moving to the even lower storage class based on the polices with confidence that the files are not likely to be uncompressed and modified (the files have not been modified for the longer period, so are not likely to be modified), achieving further cost savings. Using a policy such as this, processing resources are not wasted compressing files that are likely to be uncompressed in the future, and further the problem of not having space for recompressed files described above may be avoided.

Embodiments may implement compression and decompression as part of migration from one storage class to another. In one embodiment, different compression algorithms may be used depending on the type of data being migrated. One embodiment may use a compression algorithm or algorithms that decompresses very fast, with a high level of compression. Compression may not need to be particularly fast since compression is performed on files that are not likely to be accessed; decompression is performed when access to the file is desired or required, so decompression may have time constraints that compression does not.

Backup Mechanism for a Multi-Class File System

Embodiments of the multi-class storage mechanism and the multi-class file system may be used in combination with a backup mechanism to reduce one or more of, but not limited to, total media used, the number of tape drives (or other offline storage devices) needed, the backup window, and restore time.

Embodiments of the multi-class storage mechanism used in combination with a backup mechanism may provide the ability to schedule backups to save backup media storage space as well as backup (and restore) time. In one embodiment, a full backup of all the storage classes, including one or more higher, writeable storage classes and one or more lower, read-only storage classes, may be performed periodically, and incremental backups may be performed on the writeable storage class(es) between the full backups of the writeable storage classes. For example, data in read-only storage class may be periodically backed up in an image-based full backup while the system remains online. Periodically, incremental backups of the writeable storage class(es) may be performed. Thus, the read-only data is segregated into its own full backup. During restore, the writeable storage classes may be restored first, the applications may be started up, and then the inactive data (read-only) data may be restored while the system is up. Thus, both the backup window and the restore window may be shorter than in conventional backup and restore mechanisms. Further, in one embodiment, there may be less overall work when doing backups and restores, as there is no need to do a split mirror of storage devices in read-only storage classes.

By organizing storage into a hierarchy of storage classes including one or more writeable storage classes and one or more read-only storage classes, embodiments may reduce backup media (e.g. tape) costs, as well as scanning of file system costs, since the backup and restore does not have to walk through the entire file tree.

Figure 9:
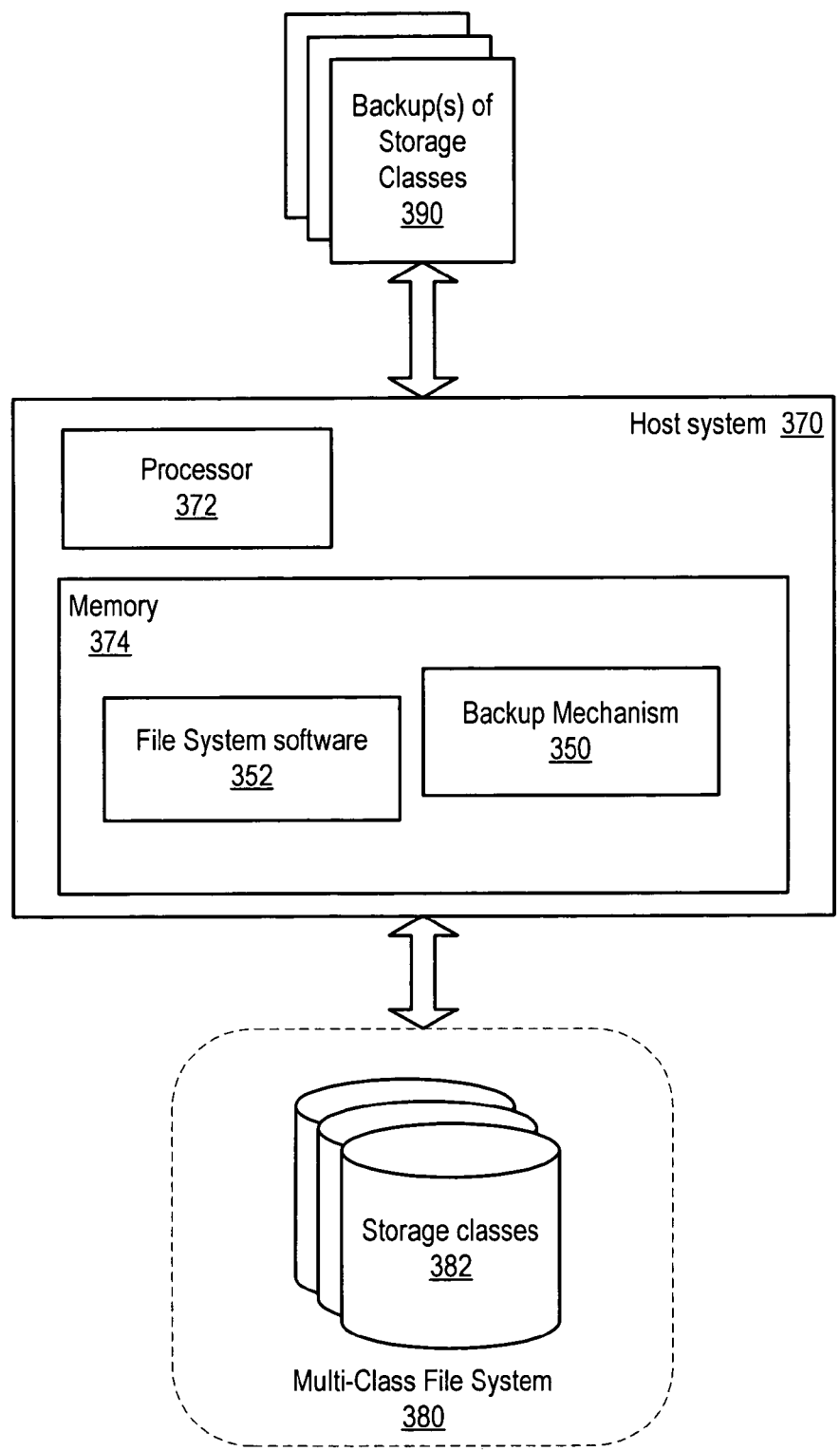
FIG. 9 illustrates a backup mechanism for an exemplary multi-class file system on a host system in a network storage environment according to one embodiment.

FIGS. 9-12 illustrate means for migrating aged data and performing backups of the storage classes in a hierarchy of storage classes of a multi-class file system. FIG. 9 illustrates a backup mechanism for an exemplary multi-class file system on a host system in a network storage environment according to one embodiment. Host system 370 may be any of various types of devices, including, but not limited to, a personal computer system, desktop computer, laptop or notebook computer, mainframe computer system, workstation, network computer, or other suitable device. Host system 370 may include at least one processor 372. The processor 372 may be coupled to a memory 374. Memory 374 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. Host system 370 may couple, for example over a wired or wireless network or networks, to one or more other devices, e.g. client systems, storage devices and backup devices, via one or more wired or wireless network interfaces. The network may, for example, be a Storage Area Network (SAN), a LAN with Network-Attached Storage (NAS), or any network capable of coupling devices to a host system 370. The storage devices may include any of one or more types of storage devices including, but not limited to, storage systems such as RAID (Redundant Array of Independent Disks) systems, disk arrays, JBODs (Just a Bunch Of Disks, used to refer to disk cabinets that do not have a built-in RAID controller), tape devices, and optical storage devices.

Host system 370 may include, in memory 374, file system software 352. File system software 352 may include, but is not limited to, an embodiment of the multi-class storage mechanism and software that provides "traditional" File System functionality. File System functionality may be provided by any of various File System software implementations including, but not limited to, Veritas' VxFS software or NFS software. In one embodiment, the software that provides the File System functionality may be used to implement the multi-class file system 380 including a hierarchy of storage classes 382, while the multi-class storage mechanism of the file system software manages the policies and directs assignment and migration of data within the multi-class file system 380 according to the user-defined policies.

Host system 370 may also include, in memory 374, a backup mechanism 350 that may interact with file system software 352 and with the multi-class file system to perform backups of the storage classes 382 of multi-class file system 380. Backup mechanism 350 may periodically perform full backups of each of the storage classes 382. In one embodiment, the full backups may be image-based backups of the storage devices in the storage classes 382. In one embodiment, the lower storage classes are backed up less frequently than the higher storage classes.

In one embodiment, one or more of the lower storage classes may be read-only storage classes, and data stored on a higher, writeable storage class that has not been written for a period (e.g. one month) may be periodically migrated (e.g. once a month) to a lower, read-only storage class. Data stored on read-only storage class that has not been accessed for a period (e.g. three months) may be periodically migrated (e.g. every three months) to a lower read-only storage class. In one embodiment, data on a read-only storage class that needs to be written to may first be migrated to a higher, writeable storage class. Thus, the backup mechanism 350 may periodically perform image-based full backups of the lower, read-only storage classes at longer intervals than backups of the higher, writeable storage classes. In one embodiment, the migration schedule for a storage class may coincide with the backup schedule of the storage class.

For example, in a multi-class file system containing a writeable storage class and two read-only storage classes, the writeable storage class may have a periodic (e.g. weekly) image-based full backup performed, along with incremental backups (e.g. performed daily). Periodically, e.g. monthly, data that have been inactive on the writeable storage class for at least that period (e.g. one month), may be migrated to the first read-only storage class. After the periodic (e.g. monthly) migration of inactive data from the writeable storage class to the first read-only storage class, a monthly image-based full backup of the first read-only storage class may be performed. At a longer period (e.g. every three months), data that have been inactive on the first read-only storage class for at least the longer period (e.g. three months) may be migrated to the second read-only storage class. After this migration, an image-based backup of the second read-only storage class may be performed. Note that these migrations leave the data active within the file system and do not move the data offline.

In one embodiment, if data on one of the read-only storage classes needs to be modified, the data are first migrated to the writeable storage class. This ensures that the read-only storage classes include only data that is not actively written, and that the modified data is on the writeable storage class where it will be more frequently backed up. In one embodiment, when data are migrated from one of the read-only storage classes to the writeable storage class, or if data on one of the read-only storage classes is deleted (e.g. if the file containing the data is deleted), the data blocks on the read-only storage class that contain the data are left untouched; the migration or deletion is indicated by changing the metadata to indicate the new location (or deletion) of the data. Thus, until the next periodic migration of data to the read-only storage class (which may potentially overwrite the data blocks), deleted data on the read-only storage class may be recovered by simply modifying the metadata rather than restoring the data from offline storage. In one embodiment, file block information from the most recent image backup may be used to recover and restore the block map.

Using this method of backing up a multi-class file system may result in reduced requirements for backup media (e.g. tapes) and potentially backup devices (e.g. tape drives). In one embodiment, files migrated to one or more lower storage classes 382 may be compressed, resulting in further savings of backup media.

Note that, while this example shows backup mechanism 350 and file system software 352 in memory 374 on the same host system 370, backup mechanism 350 and file system software 352 may reside on different systems. For example, backup mechanism 350 may reside on a different host system coupled to host system 370.

Figure 10:
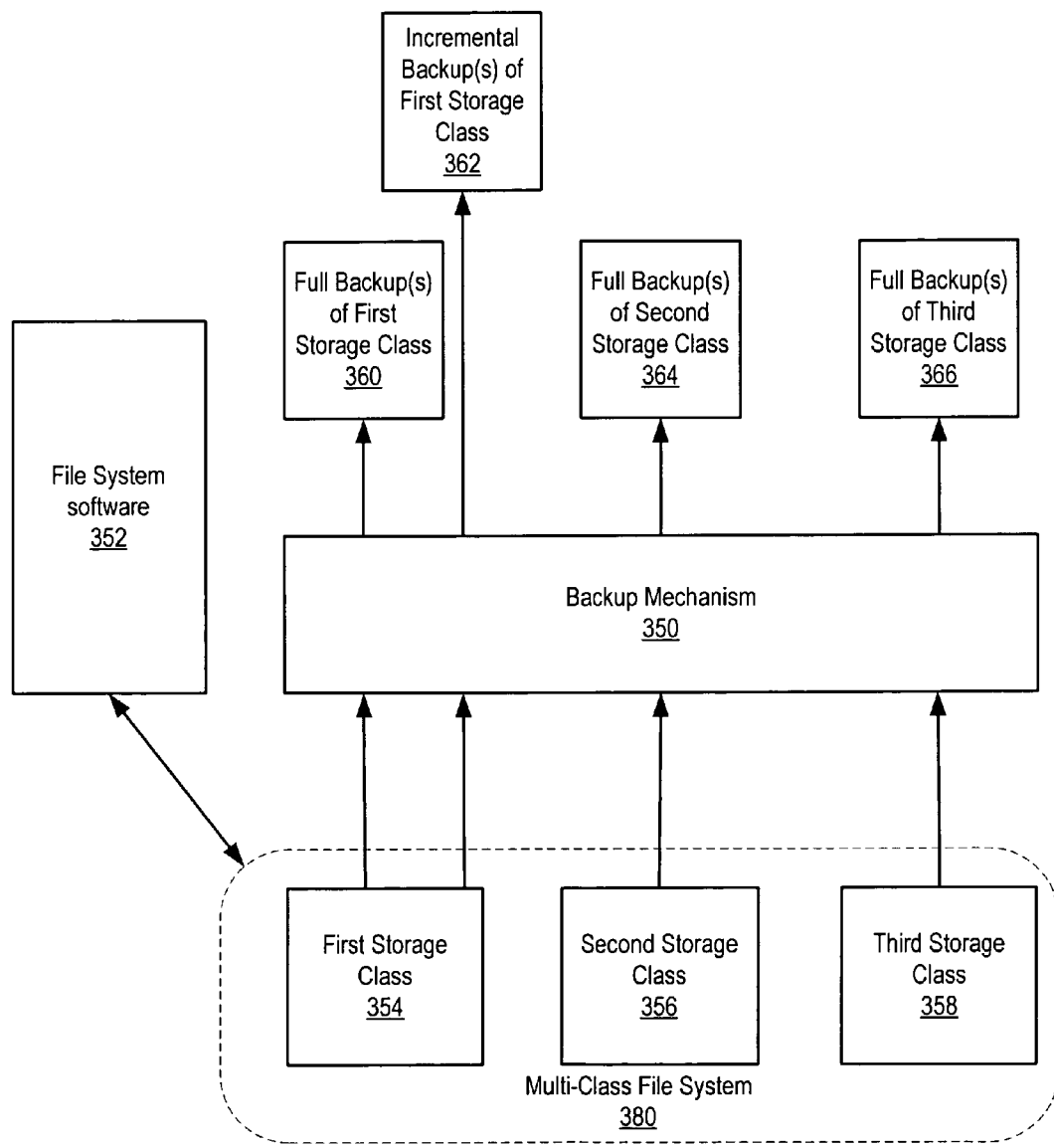
FIG. 10 illustrates a backup mechanism for an exemplary multi-class file system with three storage classes according to one embodiment.

FIG. 10 illustrates a backup mechanism for an exemplary multi-class file system with three storage classes according to one embodiment. In one embodiment, a multi-class file system 380 may be set up with a hierarchy of storage classes. The storage classes may be created using any of the mechanisms previously described. In this example, file system software 352 may include a multi-class storage mechanism as previously described. File System functionality of file system software 352 may, as previously described, implement a multi-class file system 380 on one or more storage devices; in this example, there are three storage classes. Backup mechanism 350 may interact with the multi-class file system 380 to perform backups of the three storage classes in this example according to the following description. Note that a similar method may be applied in multi-class file systems with different numbers of storage classes. Also note that, while the term "file" is used in this example, the description also applies to portions of files (e.g. ranges of blocks or extents).

In this example, a first class of data storage (first storage class 354) is mirrored on the highest speed disks and contains all the data actively being written. The second storage class 356 is a read-only storage class that contains all data that have not been written in the last month, and the third storage class 358 is a read-only storage class that contains all data that have not been written in the last quarter. The second and third storage classes may include less expensive storage devices than the first storage class 354. In one embodiment, each class of storage may be monitored for free space and automatically grown as needed. In one embodiment, if data in a read-only storage class needs to be written to, it is first migrated to a writeable storage class. In one embodiment, data may be compressed when migrated to the read-only storage classes.

If a multi-device file system is being used for the multi-class file system 380, then, in one embodiment, all the metadata may be stored on the first storage class 354 and the block mappings for files on the second and third classes may be kept stable. To keep the block mappings stable, if files are removed or migrated back to the first storage class 354, then the blocks are simply left unused in the second or third storage class and not written over. This allows an image-based backup of the first storage class 354 to be performed, and for the image-based backup of the first storage class 354 to be used in conjunction with an earlier image-based backup of the second and third storage classes without worrying about block aliasing. In one embodiment, the block mappings in the second and third storage classes may be stably maintained, and a write lock mechanism may be used on the lower (in this example, second and third) storage classes, along with a timestamp that indicates the last time the write lock was enabled. Using a write lock mechanism may allow a backup mechanism to verify the fidelity of those storage classes.

As an example, suppose that there are three storage classes, and that all three storage classes may be modified. Metadata is on a first storage class, and is backed up every week. In week 1, a file that resides on the third class is located on blocks 1-10. If the file is written in week 2, the file may be moved to the second storage class and located on blocks 101-110. If the image-based backup of week 2 is combined with the image-based backup of the third storage class from week 1, the file would point to the wrong blocks. This is the problem of block aliasing, or mistracking the identity of block(s). To ensure that storage classes backed up at the same time are static in terms of block mapping, in one embodiment, between the times that storage classes are being migrated to, file reorganization, extensions, or modifications are not allowed to occur within the storage classes. It may be permitted to remove a file; however, writing to the space vacated by the file is not allowed until the next time a file is migrated down to the device. In this embodiment, the images of the different storage classes may be backed up to get a reliable image of the file system. Thus, in one embodiment, when data is migrated down (or up) to a storage class, a new image backup of the storage class(es) may be generated. In this embodiment, by making one or more lower storage classes read-only and keeping the block mappings static if possible, it may be known that the blocks on the image backups match what the metadata says they are.

One embodiment may include one or more storage classes of writeable storage and one or more storage classes that are not writeable (read-only). Note that, in one embodiment, storage devices within a storage class may be segmented into subclasses of writeable and read-only storage devices. Files may be migrated down to a read-only storage class, but the read-only storage class is only written to during migration. To write to one of the files in a read-only storage class, the file may first be migrated up to a writeable storage class to be written to. The file may remain in the higher storage class for a period until a the multi-class storage mechanism implementing the policies determines that the file is to be migrated back to the read-only storage class, or alternatively may be immediately migrated back to the read-only storage class according to the policies.

In one embodiment, it may not be necessary to migrate an entire file because the file mapping in the file system may be implemented such that the blocks or sectors of the file that have not been modified remain on the read-only storage class and the blocks or sectors that are to be modified are migrated to the writeable storage class. Thus, parts of files as well as entire files may be migrated, and different blocks or sectors of a file may concurrently reside on different storage classes. To write to a file on a read-only storage class, blocks, sectors or records (in a database) that need to be modified may be migrated to a writeable storage class while the rest of the file stays on the read-only storage class.

The ability to migrate a portion of a file may be an important feature for databases, as an example. Once completed, a transaction in a database is typically not modified again. All transactions that have not been completed yet may reside in a writeable storage class. Periodically, completed transactions may be migrated to a read-only storage class. The database application may still need to access the transactions, so the transaction records are kept online and available (files migrated within the multi-class file system remain online in the same file system). Inactive or completed records in a database may be migrated down to a read-only storage class (remaining online in the file system) while records that are still active are stored in a writeable storage class.

Thus, embodiments of the multi-class storage mechanisms may know that data on a read-only storage class is not changing. For backups, it may be known that a large percentage of data (e.g. 80%) has not changed, so the active data (e.g. 20%) may be backed up more often (e.g. every week), and the inactive data (e.g. 80%) may be backed up less often (e.g. every month). Thus, the total amount of storage media, e.g. tape, necessary for backup may be preferably reduced by a considerable amount, as well as reducing backup time.

FIGS. 11A-11D illustrate an exemplary migration and backup schedule for an exemplary multi-class file system according to one embodiment. In this example, first storage class 354 may be a writeable storage class, and the second and third storage classes 356 and 358 may be read-only storage classes. The read-only storage classes may have write locks for preventing data to be written to the storage classes (unless the write lock is disabled) and a time stamp for determining the last time the read-only storage classes were written to. Note that this is an exemplary multi-class file system and is not intended to be limiting; a multi-class file system may be configured with one or more writeable storage classes and one or more read-only storage classes, only writeable storage classes, or even only read-only storage classes.

Figure 11A:
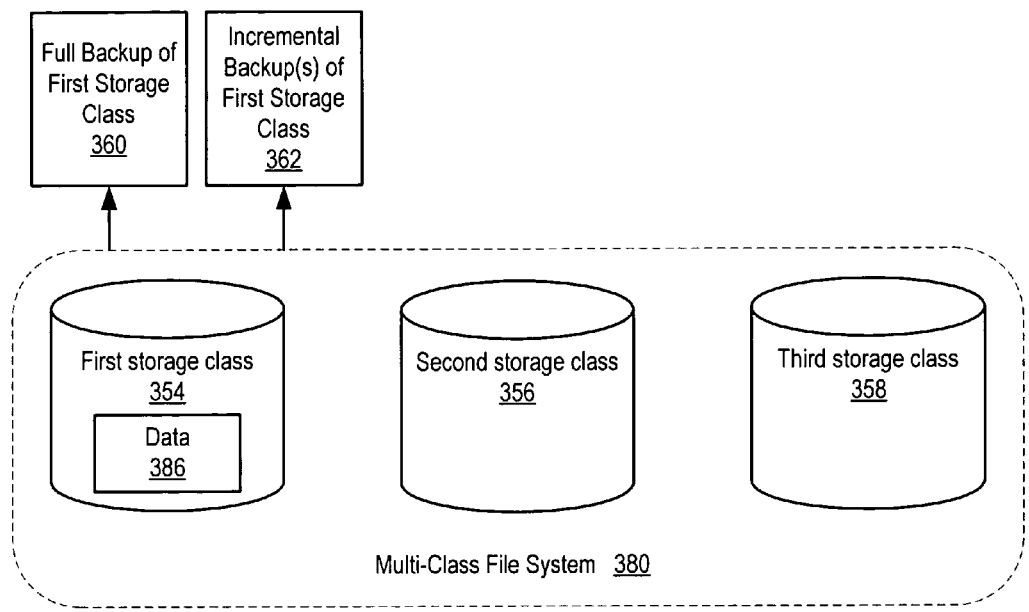
FIGS. 11A-11D illustrate an exemplary migration and backup schedule for an exemplary multi-class file system according to one embodiment.

In FIG. 11A, data 386 are initially written to the first storage class 354. Periodically (e.g., once a week) a full backup 360 of the first storage class 354 is performed. The full backup 360 may be an image backup. Incremental backups 362 of the first storage class 354 may be performed between full backups 360, for example every day. The incremental backups 362 may be file-based backups.

Figure 11B:
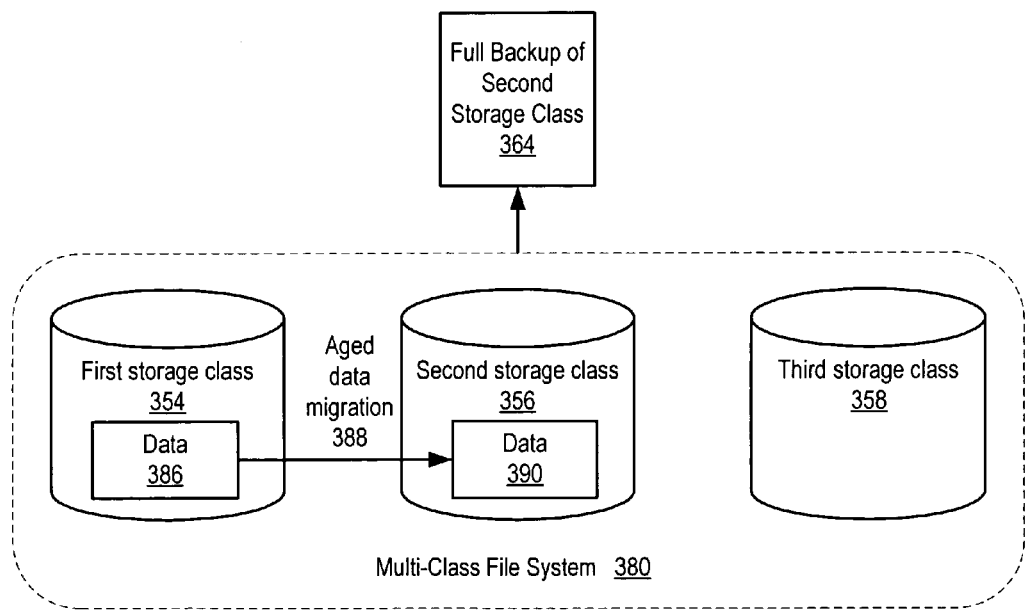

In FIG. 11B, periodically (e.g., once a month), the write lock is disabled on the second storage class 356, and data 390 in the first storage class 354 that has not been written to for at least that period (e.g. for at least a month) is migrated from the first storage class 354 to the second storage class 356, as indicated at 388. Note that migrated data 390 remains online in the file system. After migration, the write lock is re-enabled for the second storage class 356. A full backup of the second storage class 356 may be generated by the backup mechanism after the data 390 are migrated. Full backup 364 may be an image backup. In addition, a full backup of the first storage class 354 may be performed after migration 388. In one embodiment, data 390 may be compressed when migrated to second storage class 356.

Figure 11C:
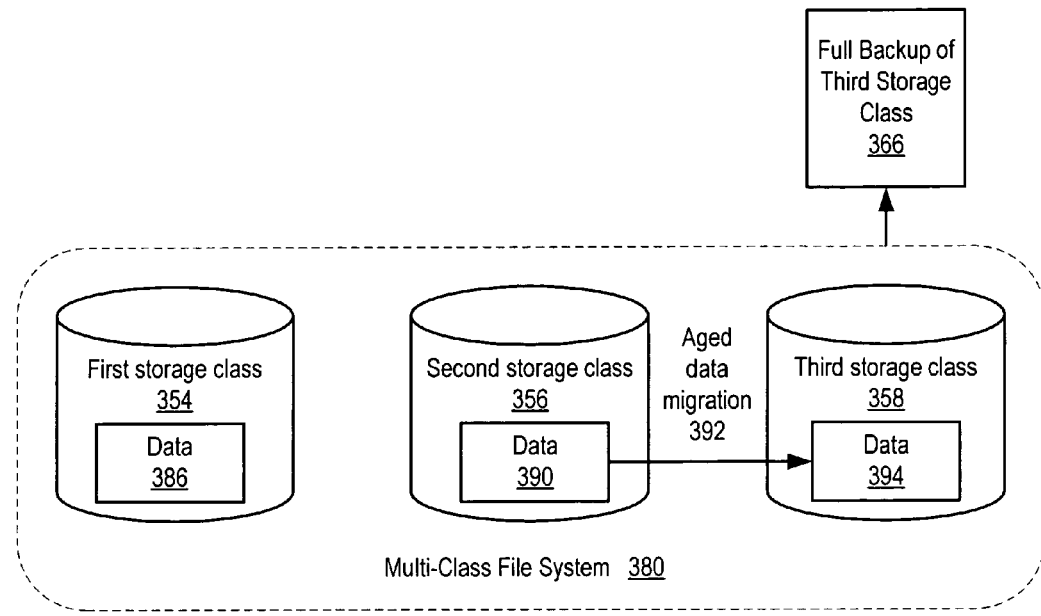

In FIG. 11C, periodically, (e.g. once a quarter), the write lock is disabled on the third storage class 358, and data 394 in the second storage class 356 that has not been written to for at least that period (e.g. for at least three months) is migrated from the second storage class 356 to the third storage class 358, as indicated at 392. Note that migrated data 390 remains online in the file system. After migration, the write lock is re-enabled for the third storage class 358. A full backup of the third storage class 358 may be generated by the backup mechanism after the data 394 are migrated. Full backup 358 may be an image backup. In addition, a full backup of the first storage class 354 may be performed after migration 392. In one embodiment, data 394 may be compressed when migrated to third storage class 358.

With this schedule, the third storage class 358 may only be backed up at longer intervals, for example every three months. The second storage class 356 may be backed up at shorter intervals than the third storage class 358, for example once a month. The backups of the read-only storage classes may be performed in conjunction with the migration of aged data to the read-only storage classes. In one embodiment, the full backups of the read-only storage classes may be done online without using split mirrors, since the storage classes are write locked and stable. The first storage class 354 and the metadata may have a full backup 360 more often, for example weekly, along with a set of incremental backups 362 (which may be file-based backups) performed, for example, daily. In one embodiment, the full backups of all storage classes may all be image-based, which is typically faster than file-based backup. Thus, there is no need for a synthesized full backup.

FIGS. 11A-11C illustrate migrating aged data from a first storage class to a second class, backing up the second storage class, migrating aged data from the second class to a third storage class, and backing up the third storage class. In an alternative migration and backup schedule, aged data may first be migrated from a second storage class to a third storage class, and then the third storage class may be backed up. After completion of the migration to the third storage class, aged data may be migrated from the first storage class to the second storage class, and then the second storage class may be backed up. Finally, the first storage class may be backed up after migrating aged data to the second storage class. This migration and backup schedule empties the second storage class of aged data before migrating in the new aged data from the first storage class. Further, files are not backed up from the second storage class and then migrated to the third storage class to be backed up again. Similarly, files are not backed up from the first storage class and then migrated to the second storage class to be backed up again. Thus, for this migration and backup schedule, the order of FIGS. 11A-11C may be reversed.

Figure 11D:
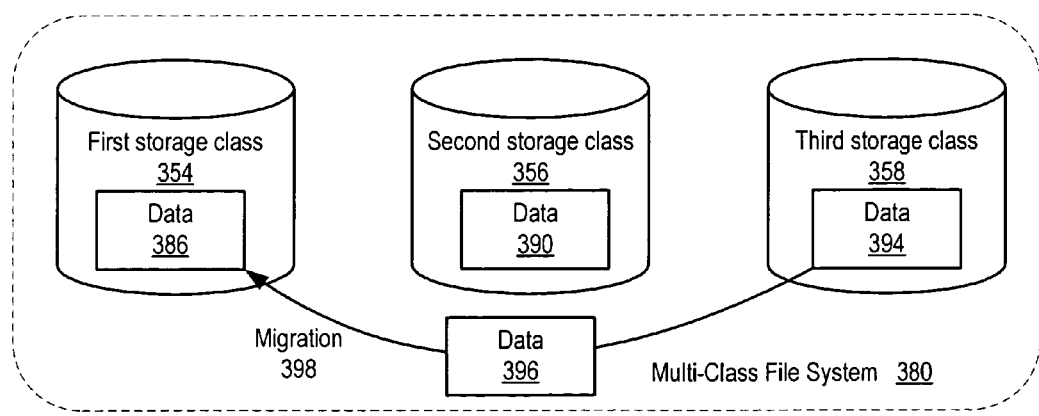

FIG. 11D illustrates migrating data to be modified from a read-only storage class to a writeable storage class. In this example, data 396 on third storage class 358 may need to be modified. Data 396 is migrated from the read-only third storage class 358 to the writeable first storage class 354 prior to modification, and may then be modified on the writeable first storage class 354.

In one embodiment, a read-only storage class remains stable between periodic migrations of aged data. When data that needs to be modified is migrated from a read-only storage class to a writeable storage class, the data blocks in the read-only storage class may not be overwritten until the next migration of aged data to the read-only storage class. The data is copied to the writeable storage class, and the metadata for the data is modified to indicate the new location for the data in multi-class file system 380. Similarly, when data is deleted from a read-only storage class, the data blocks in the read-only storage class may not be overwritten until the next migration of aged data to the read-only storage class. The metadata for the data is modified to indicate the data has been deleted. Thus, if data that was deleted since the last periodic migration needs to be restored to a read-only storage class, instead of restoring the data from a backup of the storage class, a block map may be used (e.g. a block map from a full backup performed after the last migration of aged data) to restore the metadata to indicate that the data is on the read-only storage class at the block locations indicated by the block map from the full backup.

To restore the entire multi-class file system 380, the last full backup of each storage class may be restored, and then the incremental backups of the first storage class 362 may be applied. In one embodiment, a full backup of the first storage class 360 may first be applied, then any necessary incremental backups of the first storage class 362, followed by the full backups of the second and third storage classes. In one embodiment, the multi-class file system 380 may be brought back online and made available to application(s) after the full and incremental backups of the first storage class 354 are restored and before the full backups of the other storage classes have been (fully) restored.

Consider as an example, a multi-class file system where 10% of the data is active and stored according to the polices on a first storage class, 20% of the data was written in the last quarter and is stored according to the policies on a second storage class, and 70% of the data has been unwritten for the last quarter and is stored according to the policies on a third storage class. In this example, each week, 10% of the data may be backed up offline, so the backup window may be reduced by a factor of 10. Split mirrors for only 10% of the data are required, reducing the cost of extra disks for backup. In addition, cost to preserve offsite copies of the media is reduced. For 52 weeks of full backups, 52 times as much tape as there is disk would be needed. Using an embodiment of the backup mechanism, 4*.7 plus 12*.2 plus 52*.1, or 9.4 times as much tape as disk, may be needed. This saves about 80% of tape media cost and, since the weekly backups are much smaller, there may be savings on drives as well.

Embodiments of a backup mechanism for multi-class file systems may enable an optimized restores of data to the multi-class file systems. To do a restore using the above example, the image backup of the active 10% may be restored to the first storage class. Then, the incremental backups (which may be file based) may be applied. At this point, all the active data has been restored. The application(s) that access the data may then be started and may access the active data while the second and third storage classes are being restored. In effect, operations have been restarted after restoring only about 10% of the data. In one embodiment, to handle read requests for data on the second or third storage classes, either the volume manager or the file system software may block the request until the data has been restored. In one embodiment, a snapshot mechanism of a volume manager (e.g., Veritas' Volume Manager) may be used to do this and, since the restore is image based, the restore mechanism may skip ahead to restore requested blocks at the expense of slowing down the completion of the restore slightly.

One embodiment may provide the ability to perform device-oriented or device-level backup rather than strictly file-level backups. Data, even within files, that is not being written may be segregated from actively written data. An image backup of the devices within the read-only storage classes may be performed periodically, e.g. every one, three, or six months. More active data on storage devices within the writeable storage classes may be backed up more often, e.g. every month. The most active data on storage devices within a highest storage class may be backed up even more often. Data is segregated by storage class, so in one embodiment image backups of storage devices in different storage classes may be performed. Image backups tend to be faster than file-based or other backups, and only data that is needed for the backups of the particular storage classes may be backed up in the image backups.

In one embodiment of the backup mechanism, incremental backups may back up just the data blocks or records within a file that have been changed, and not the entire file. Unmodified portions of a file remain on devices within the read-only storage classes, while modified portions of the file are stored on devices within writeable storage classes. The backup mechanism may perform incremental backups of just the writeable storage classes, and thus may only back up the portions of the file that have been modified and not the entire file.

In one embodiment, the storage classes within the multi-device file system may themselves be layered, and the backup/restore mechanism may be applied within a storage class. For example, a read-only storage class may be broken into levels of actively accessed read-only data and non- or rarely-accessed read-only data, the latter of which may be compressed. Each of these levels may be stored on different subclasses of storage within the more general read-only storage class. The actively accessed read-only data may be backed up more frequently than the non- or rarely-accessed data. This segmentation may also be applied to other classes of storage, e.g. a writeable storage class may be segmented into two or more subclasses based on criteria such as frequency of access. Note that other criteria than frequency of access may be applied within a storage class to create subclasses or divisions within the storage class. As an example, importance of the data may be used as a criterion; some data within a storage class may be deemed more important or critical than other data, and thus may be segmented from the less important data (e.g. by storing the different data on different storage devices within the storage class) and a backup schedule may be geared towards selectively backing up the qualitatively different data based on the criteria used to segment the data.

Note that embodiments may perform individual file backups and restores in addition to image backups and restores. For serious or widespread damage, the entire multi-class file system may be restored.

Figure 12:
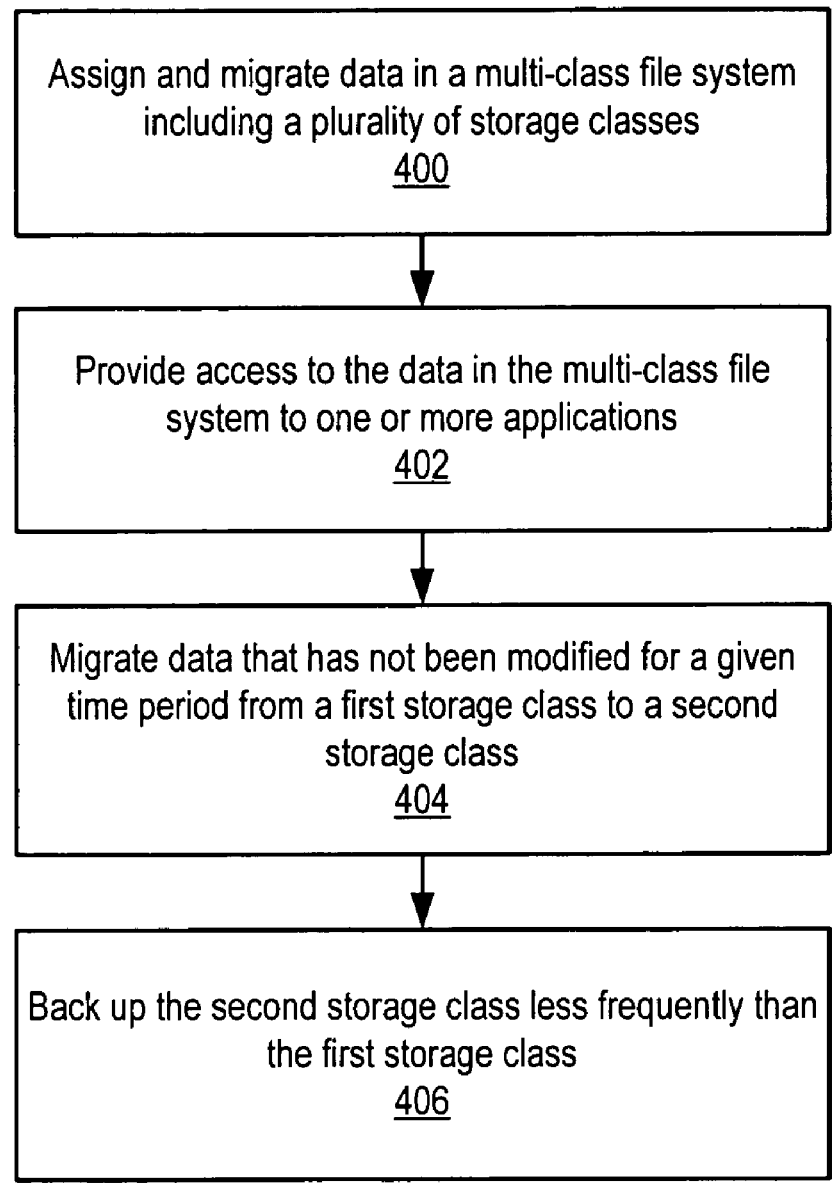
FIG. 12 is a flowchart of a method for performing backups of a multi-class file system according to one embodiment.

FIG. 12 is a flowchart of a method for performing backups of a multi-class file system according to one embodiment. As indicated at 400, data may be assigned and migrated in a multi-class file system including a plurality of storage classes. The multi-class file system may be implemented on one or more storage devices, e.g. by File System functionality of the file system software. In one embodiment, a multi-device feature of the file system software (e.g. Veritas' VxFS) may be used to implement the multi-class file system. Different mechanisms for implementing the underlying hierarchy of the multi-class file system were previously described. In one embodiment, each storage class includes one or more storage devices assigned to the storage class according to one or more characteristics of the storage class, e.g. performance characteristics. In one embodiment, the storage classes may be ordered in a hierarchy according to performance characteristics from a highest storage class including one or more high-performance storage devices to a lowest storage class comprising one or more low-performance storage devices.

Recently accessed files may be assigned and/or migrated to higher storage classes and less recently accessed files may be assigned and/or migrated to lower storage classes in the hierarchy by a multi-class storage mechanism according to a set of user-defined policies. In one embodiment, one or more of the higher storage classes may be designated as writeable storage classes for storing data that have been recently modified, and one or more of the lower storage classes may be designated as read-only storage classes for storing "aged" data that have been less recently modified. In one embodiment, file system metadata may be modified to indicate assignment or migration of the files. In one embodiment, the file system software may migrate portions of a file to different storage classes according to the user-defined policies. For example, actively written records of a database file may be stored in a higher storage class of the multi-class file system, with inactive database records migrated to a lower or lowest storage class. In one embodiment, files migrated to lower storage classes may be compressed.

As indicated at 402, the file system software may provide access to the data in the multi-class file system to one or more applications. The applications may write new data to one or more of the storage classes, access data on the writeable storage class(es) for read or write operations, and access data on the read-only storage classes for read operations. If an application needs to access data currently stored on a read-only storage class for a write operation, the data are first migrated to a writeable storage class where the application's write operations may be performed on the data.

As indicated at 404, at a given time interval (e.g. once a month), data that has not been modified for a given time interval (e.g. one month) may be migrated from a first, writeable, storage class to a second, read-only, storage class of the multi-class file system. In one embodiment, to migrate the data to the second storage class, a write lock of the second storage class may be disabled during the migration and re-enabled after the migration. The data on the second storage class is not modifiable by the application(s) while on the second storage class. To modify data currently stored on the second storage class, the data are first migrated to the first storage class. In one embodiment, data migrated to the second storage class may be compressed. In one embodiment, a backup of the second storage class may be performed after the migration of aged data from the first storage class to the second storage class.

The multi-class file system may include a third, read-only storage class. At a given time interval (e.g. once a quarter), data that has not been modified for a given time interval (e.g. three months) may be migrated from the storage class to the third storage class. In one embodiment, to migrate the data to the third storage class, a write lock of the third storage class may be disabled during the migration and re-enabled after the migration. The data on the third storage class is not modifiable by the application(s) while the data is on the third storage class. To modify data currently stored on the third storage class, the data are first migrated to the first storage class. In one embodiment, data migrated to the third storage class may be compressed. In one embodiment, a backup of the third storage class may be performed after the migration of aged data from the second storage class to the third storage class.

Note that migrated data remains in the same file system and is not moved offline. Migration is performed by modifying file system metadata, and is transparent to the applications that access the multi-class file system. Path information in the file system metadata is not modified during migration.

Since data is not modifiable by the applications while on a read-only storage class, the read-only storage class remains stable between migrations of aged data to the read-only storage classes. When a portion of the data on a read-only storage class is deleted, the data blocks are not erased or overwritten until the next migration of aged data to the read-only storage class. Deleting data on a read-only storage class modifies the file system metadata to indicate the deletion and does not erase or overwrite the data blocks containing the deleted data. Thus, if a portion of the data on a read-only storage class is deleted (e.g. if an application deletes a file, at least part of which is on the read-only storage class), the portion of the data may later be restored, if desired, by modifying the file system metadata to point to the data blocks on the read-only storage class containing the portion of the data without requiring that the portion of the data be restored from a backup.

As indicated at 406, backups of each of the storage classes may be performed at given time intervals using a backup mechanism. In one embodiment, the backups of the read-only storage classes may be performed after migrating aged data to the read-only storage classes. In one embodiment, the backups may be image-based backups of the storage devices in the storage classes. In one embodiment, lower storage classes are backed up less frequently than higher storage classes. For example, in a multi-class file system with three storage classes, a first, writeable storage class may be backed up once a week, a second, read-only storage class once a month (e.g. after migration of aged data from the first storage class), and a third storage class once every three months (e.g. after migration of aged data from the second storage class). The time intervals between the backups may be user-specified according to business requirements. Using this method of backing up a multi-class file system may result in reduced requirements for backup media (e.g. tapes) and potentially backup devices (e.g. tape drives).

In one embodiment, one or more of the lower storage classes may be write-locked, and the backups of the write-locked lower storage classes may be performed without using split mirrors of the storage devices in the write-locked lower storage classes.

In one embodiment, one or more incremental backups of the higher storage classes including recently modified data may be performed between full backups of the higher storage classes. For example, a full backup of a first, writeable storage class may be performed weekly, with incremental backups performed nightly. In one embodiment, recently modified portions of files may be stored on writeable storage classes while less recently modified portions of the files are stored on or migrated to on read-only storage classes. Incremental backups of the writeable storage classes may thus back up only the recently modified portions of the files, saving backup media space and backup time.

Note that the multi-class file system may include one or more writeable storage classes and one or more read-only storage classes. Alternatively, all the storage classes may be writeable, or all the storage classes may be read-only. Progressively less recently modified (or read-accessed, for read-only storage classes) data may be migrated down in the hierarchy of storage classes, at progressively longer time intervals, from a highest storage class to a lowest storage class. Backups of the storage classes may be performed progressively less frequently from the highest storage class to the lowest storage class. Accessed data may be migrated up in the hierarchy of storage classes; for modification, data on read-only storage classes is first migrated to a writeable storage class.

Performing Operations without Using Split Mirrors

Traditionally, to perform certain operations in a file system, for example an image backup, a split mirror (hardware or software) may be generated to provide a stable copy. When performing operations such as an image backup, creating a second copy for doing testing or batch processing on a database, periodic replication or certain batch jobs, file system cloning or device level split mirrors are typically used to achieve a stable copy of the storage. Using a multi-class file system implemented by an embodiment of the multi-class storage mechanism to segregate data being actively modified (active data) from data not actively being modified (inactive data), such operations that normally use split mirrors may be performed without using split mirrors for all the storage.

A split mirror is a stable copy broken off from a mirror image. In one embodiment, if there is a storage class that stores inactive data, or in one embodiment a read-only storage class, and an operation is performed that typically requires a split mirror, a split mirror of the devices in the storage class may not be required. In one embodiment, for one or more of the storage classes in a multi-class file system that are read-only or store inactive data, the devices in the storage classes may have a verifiable write lock that indicates the last time the devices in the storage classes were written to, and an operation that would otherwise require a split mirror may be performed without actually generating a split mirror if the write lock indicates the data on the storage classes is stable. For example, to do an image backup using the exemplary backup mechanism 350 as illustrated in FIGS. 9-11, a split mirror of the writeable storage class(es) (e.g. the first storage class 354) may be generated, but a split mirror of the read-only storage class(es) (e.g. the second and/or third storage classes) may not be required. Instead, the write lock may be examined to determine if the read-only files are stable images (have not been modified).

The multi-device file system may support two or more storage devices segmented into classes under one file system. If one or more storage devices contain the file system metadata and/or data (files or portions of files) that are actively modified, and one or more other storage devices contain only inactive data (which may be read but not written to while on the storage devices), then any operations that typically use a split mirror may use a split mirror of only the first set of storage devices containing active data. Other storage devices or classes may contain data (files or portions of files) that are inactive. Note that these storage devices may be in the same class or in different classes of the multi-class storage system. The second set of storage devices contains data that is read-only while stored on the storage devices, so no split mirror may be needed for the operation. As an example, a backup mechanism may use this technique to reduce split mirror storage needed for backups and reduce the overhead of performing mirror operations. In some embodiments, for the second set of storage classes, a mirror may not be available to be split, so split mirrors may not be used for operations on these storage classes. In other embodiments, mirrors may be maintained for the second set of storage classes, but certain operations may still be performed without using split mirrors of the second set of storage classes.

In one embodiment, the multi-class storage mechanism may track access on a block or extent basis within a file, so each block or extent of a file may be located on one of the storage devices based on when it was last written. Thus, blocks or extents of a file may be located on different devices, with actively written blocks or extents located on storage devices containing actively written data, and read-only or inactive blocks on other storage devices.

In one embodiment, a write lock may be implemented on a storage device or storage class, and an application may query to discover the last time one of the storage devices or storage classes was enabled for write. In one embodiment, an application may block the file system from enabling the device for writing for the duration of the operation. This allows the application to make sure it has a stable image for the duration of its operation.

In one embodiment, an application may check the write lock on a storage device or storage class to make sure it is enabled and not locked by another entity before proceeding to perform an operation on the storage device or storage class without using a split mirror. A write lock may indicate its current state as well as the last time the storage device or storage class was locked for write access. After the operation is completed for the storage device or storage class, the application may again check the write lock, and if the write lock indicates the storage device or storage class was write locked at any time during the operation, the results of the operation may be considered invalid and the operation may be retried. In one embodiment, the operation may be retried without using a split mirror. In one embodiment, if necessary or desired, the operation may be retried using a split mirror. In one embodiment, the write lock may be checked by the application during the operation on the storage device or storage class to determine if the write lock indicates the storage device or storage class was write locked at any time during the operation. In one embodiment, if the storage device or storage class was write locked at any time during the operation, the operation may be terminated and retried.

Figure 13:
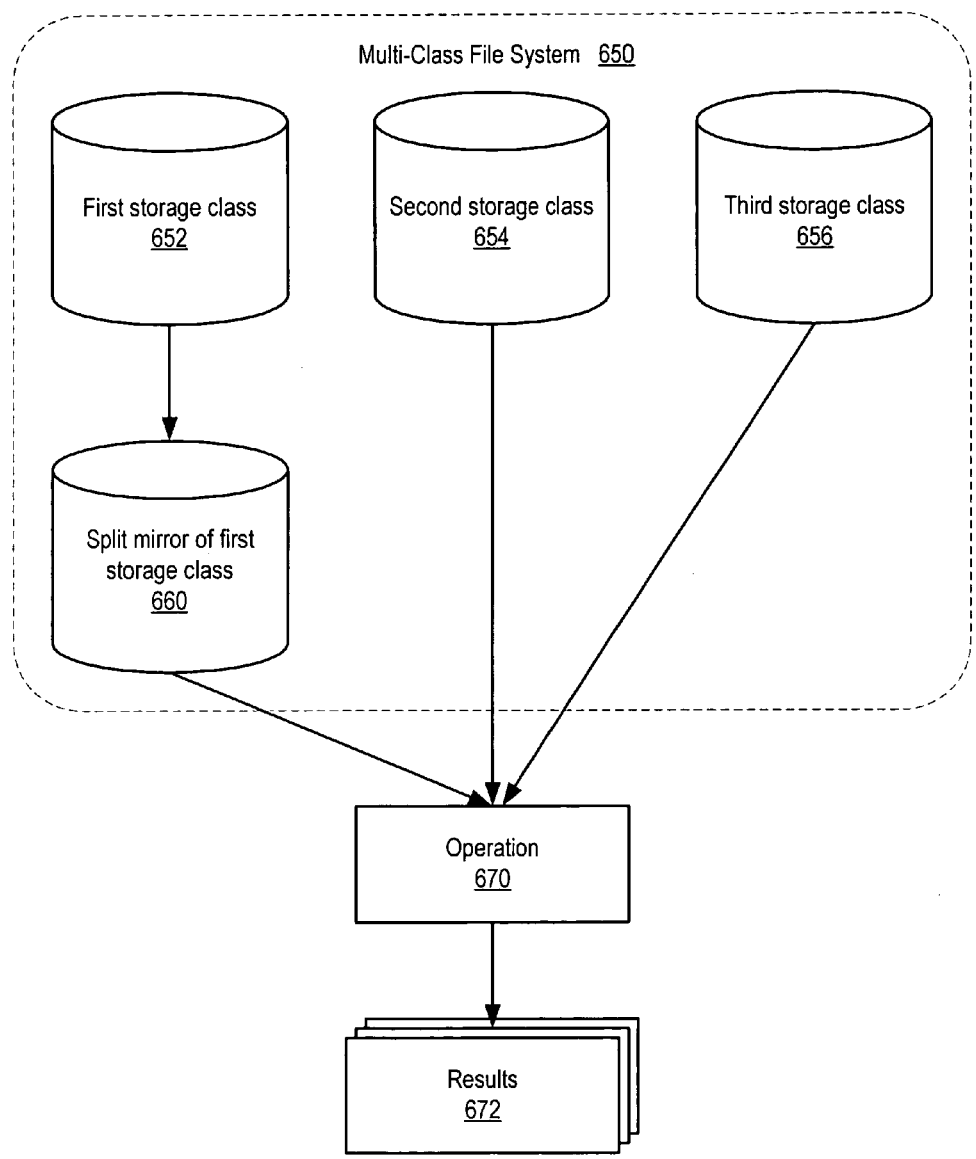
FIG. 13 illustrates performing an operation on an exemplary multi-class file system that requires stable images of the storage classes without using split mirrors for one or more storage classes according to one embodiment.
Figure 14:
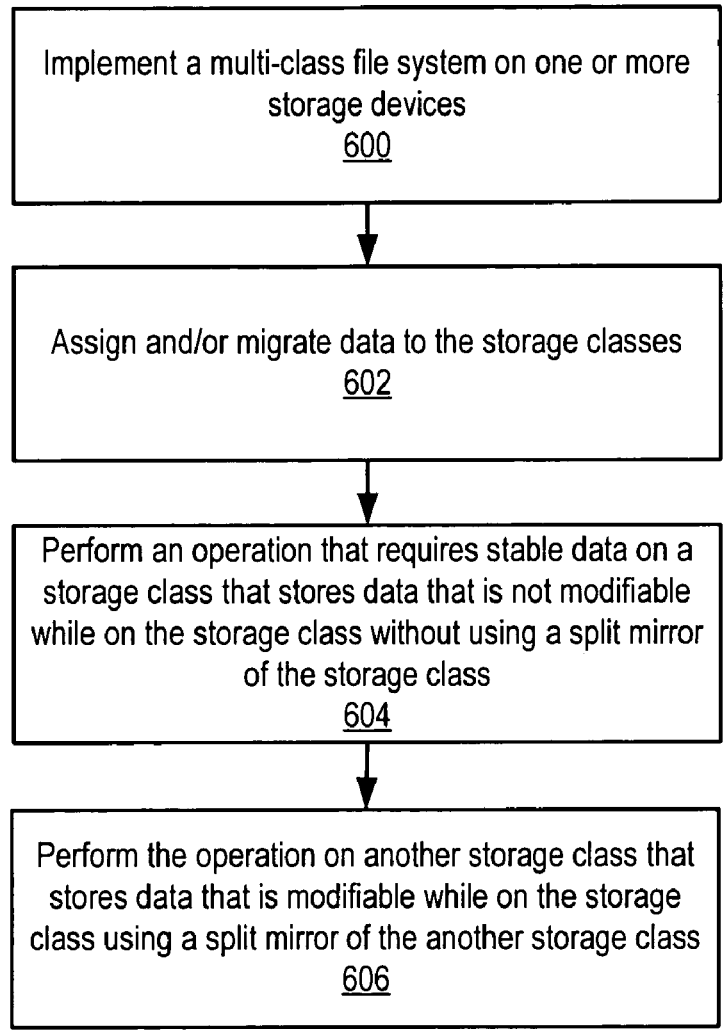
FIG. 14 is a flowchart of a method for performing operations in a multi-class file system without requiring split mirrors according to one embodiment.

FIGS. 13 and 14 illustrate means for performing operations that require a stable copy of storage classes in a multi-class file system without generating a split mirror of read-only storage classes. FIG. 13 illustrates performing an operation on an exemplary multi-class file system that requires stable images of the storage classes without using split mirrors for one or more storage classes according to one embodiment. First storage class 652 of multi-class file system 650 may store actively modified data. Second storage classes 654 and 656 may store inactive or read-only data. For example, second storage class 654 may store data migrated from first storage class 652 that has not been modified for a time interval (e.g. one month). Third storage class 656 may store data migrated from second storage class 654 that has not been modified for a longer time interval (e.g. three months). In one embodiment, the second and third storage classes are only written to during the migration of inactive data to the storage classes. Thus, the second and third storage classes may be kept stable between migrations. In one embodiment, the second and third storage classes may be write-locked. To modify data on one of these storage classes, the data may first be migrated to first storage class 652.

An application may need to perform an operation 670 that requires stable copies of the storage classes in the multi-class file system 650, for example image backups. The first storage class 652 includes data that are actively modified; therefore, to obtain a stable copy of this storage class, the operation 670 may be performed on a split mirror 660 of the first storage class 652. Since the second and third storage classes store data that have not been modified for some time interval, the application can determine that the storage classes are stable copies, and may thus perform the operation 670 directly on the storage classes without using a split mirror of the storage classes. In one embodiment, storage classes 654 and 656 may be write locked, and the application may check the write lock to determine the time of the last update of the storage classes. In one embodiment, the application may block write access to the storage classes 654 and 656 to ensure the storage classes are stable for the duration of operation 670. Results 672 of the operation may be generated, for example image backups if operation 670 is a backup operation.

FIG. 14 is a flowchart of a method for performing operations in a multi-class file system without using split mirrors according to one embodiment. As indicated at 400, a multi-class file system including a hierarchy of storage classes may be implemented on one or more storage devices. In one embodiment, a multi-device feature of file system software (e.g. Veritas' VxFS) may be used to implement the multi-class file system. Different architectures for the underlying structure of the multi-class file system were previously described. In one embodiment, each storage class includes one or more storage devices assigned to the storage class according to one or more characteristics of the storage class, e.g. performance characteristics. In one embodiment, the storage classes may be ordered in the hierarchy of storage classes according to performance characteristics from a highest storage class including one or more high-performance storage devices to a lowest storage class comprising one or more low-performance storage devices. In one embodiment, one or more of the storage classes may be write-locked storage classes for storing data that is read-only while on the write-locked storage classes.

Actively modified data may be assigned and/or migrated to higher storage classes and inactive or read-only data may be assigned and/or migrated to lower storage classes in the hierarchy by a multi-class storage mechanism according to a set of user-defined policies, as indicated at 602. For example, a first storage class of the multi-class file system may store actively modified data. A second storage class may store inactive or read-only data. For example, the second storage class may store data migrated from the first storage class that has not been modified for a given time interval (e.g. one month) and is thus considered inactive. To modify data stored on the second storage class, the data may first be migrated to the first storage class. In one embodiment, the second storage class is only written to during the migration of inactive data from the first storage class to the second storage class. Thus, the second storage class that stores inactive data may be kept stable between migrations. There may be one or more storage classes for active data and one or more storage classes for inactive data. In one embodiment, file system metadata may be modified to indicate assignment or migration of the data. In one embodiment, the file system software may migrate portions of a file to different storage classes according to the user-defined policies. For example, actively written records of a database file may be stored in a higher storage class of the multi-class file system, with inactive database records migrated to a lower storage class.

An operation that requires a stable copy of the storage classes may need to be performed, e.g. by the file system software or by an application using the multi-class file system. The operation may, for example, be a backup operation such as that described in FIG. 10, creating a second copy for doing testing or batch processing on a database, or any other operation that requires a stable copy. As indicated at 604, to perform the operation on a storage class that stores inactive data, such as the second storage class described above, since the storage class is kept stable between migrations of inactive data to the storage class, the operation may be performed without using a split mirror of the storage class. As indicated at 606, to perform the operation on another storage class that stores data that is modifiable while on the storage class, such as the first storage class described above, a split mirror of the other storage class may be used.

In one embodiment using write locks, to perform the operation on a read-only storage class, a write lock of the storage class may be examined to determine if the write-locked storage class has been written to. If the write-locked storage class has not been written to, the operation may be performed on the write-locked storage class without using a split mirror of the write-locked storage class. In one embodiment, the entity performing the operation may block the file system software from enabling the write-locked storage class for writing for the duration of the operation.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a processor; and
a memory comprising program instructions, wherein the program instructions are executable by the processor to implement:
file system software configured to assign and migrate data in a multi-class file system comprising a hierarchy of storage classes, wherein the migrated data remains online within the multi-class file system, wherein one or more of the storage classes store data that is not modifiable but is readable by applications while the data is on the one or more storage classes, and wherein one or more others of the storage classes store data that is modifiable by applications while the data is on the one or more storage classes; and an application configured to perform an operation on data stored in the multi-class file system, wherein the operation requires stable data, wherein, to perform the operation, the application is configured to:
perform the operation on at least one of the one or more storage classes that store data that is not modifiable without using a split mirror of the at least one of the one or more storage classes; and
perform the operation on at least one of the one or more other storage classes that store data that is modifiable using a split mirror of the at least one of the one or more other storage classes.

2. The system as recited in claim 1, wherein the operation is a backup of the storage classes.

3. The system as recited in claim 1, wherein the one or more storage classes that store data that is not modifiable by applications while the data is on those storage classes are configured to be write locked, and wherein, to perform the operation on at least one of the one or more storage classes that store data that is not modifiable without using a split mirror of the at least one of the one or more storage classes, the application is further configured to, for each write-locked storage class on which the operation is performed:
examine a write lock of the write-locked storage class to determine if the write-locked storage class could have been written to during the operation on that storage class; and
if said examine a write lock of the write-locked storage class determines the storage class could have been written to during the operation on that storage class, retry the operation for the write-locked storage class.

4. The system as recited in claim 1, wherein the one or more storage classes that store data that is not modifiable by applications while the data is on those storage classes are configured to be write locked, and wherein the application is further configured to block the file system software from enabling a write-locked storage class for writing for the duration of the operation.

5. The system as recited in claim 1, wherein the data includes files or portions of files.

6. The system as recited in claim 1, wherein the data comprises one or more of application data and file system metadata.

7. The system as recited in claim 1, wherein the storage classes are ordered in the hierarchy according to one or more characteristics from a highest storage class to a lowest storage class.

8. The system as recited in claim 7, wherein the one or more characteristics include one or more of performance and cost.

9. The system as recited in claim 1, wherein the storage classes are ordered in the hierarchy of storage classes according to performance characteristics from a highest storage class comprising one or more high-performance storage devices to a lowest storage class comprising one or more low-performance storage devices.

10. A system, comprising:
a plurality of storage devices;
a host system configured to couple to the plurality of storage devices via a network, wherein the host system comprises:
file system software configured to assign and migrate data in a multi-class file system comprising a hierarchy of storage classes, wherein migrated data remains online within the multi-class file system, wherein one or more of the storage classes store data that is not modifiable but is readable by applications while the data is on the one or more storage classes, and wherein one or more others of the storage classes store data that is modifiable by applications while the data is on the one or more storage classes; and an application configured to perform an operation on data stored in the multi-class file system, wherein the operation requires stable data, wherein, to perform the operation, the application is configured to:

perform the operation on at least one of the one or more storage classes that store data that is not modifiable without using a split mirror of the at least one of the one or more storage classes; and perform the operation on at least one of the one or more other storage classes that store data that is modifiable using a split mirror of the at least one of the one or more other storage classes.

11. The system as recited in claim 10, wherein the operation is a backup of the storage classes.

12. The system as recited in claim 10, wherein the one or more storage classes that store data that is not modifiable by applications while the data is on those storage classes are configured to be write locked, and wherein, to perform the operation on at least one of the one or more storage classes that store data that is not modifiable without using a split mirror of the at least one of the one or more storage classes, the application is further configured to, for each write-locked storage class on which the operation is performed:

examine a write lock of the write-locked storage class to determine if the write-locked storage class could have been written to during the operation on that storage class; and if said examine a write lock of the write-locked storage class determines the storage class could have been written to during the operation on that storage class, retry the operation for the write-locked storage class.

13. The system as recited in claim 10, wherein the one or more storage classes that store data that is not modifiable by applications while the data is on those storage classes are configured to be write locked, and wherein the application is further configured to block the file system software from enabling a write-locked storage class for writing for the duration of the operation.

14. A system, comprising:

software means for assigning and migrating data in a multi-class file system comprising a plurality of storage classes and for providing access to the data in the multi-class file system to one or more applications, wherein migrated data remains online within the multi-class file system, wherein one or more of the storage classes store data that is not modifiable but is readable by the applications while the data is on the one or more storage classes, and wherein one or more others of the storage classes store data that is modifiable by applications while the data is on the one or more storage classes; and means for performing operations that require stable data on data stored in the multi-class file system, wherein said means for performing operations that require stable data comprise:

means for performing the operations on the one or more storage classes that store data that is not modifiable without using a split mirror of the one or more storage classes; and means for performing the operations on the one or more other storage classes that store data that is modifiable using a split mirror of the one or more other storage classes.

15. The system as recited in claim 14, further comprising means for blocking write access to the one or more storage classes that store data that is not modifiable for the duration of the operations.

16. A method, comprising:

file system software assigning and migrating data in a multi-class file system comprising a hierarchy of storage classes, wherein migrated data remains online within the multi-class file system, wherein one or more of the storage classes store data that is not modifiable but is readable by applications while the data is on the one or more storage classes, and wherein one or more others of the storage classes store data that is modifiable by applications while the data is on the one or more storage classes; and performing an operation on data stored in the multi-class file system, wherein the operation requires stable data, wherein said performing the operation comprises:

performing the operation on at least one of the one or more storage classes that store data that is not modifiable without using a split mirror of the at least one of the one or more storage classes; and performing the operation on at least one of the one or more other storage classes that store data that is modifiable using a split mirror of the at least one of the one or more other storage classes.

17. The method as recited in claim 16, wherein the operation is a backup of the storage classes.

18. The method as recited in claim 16, wherein the one or more storage classes that store data that is not modifiable by applications while the data is on those storage classes are write locked, and wherein said performing the operation on at least one of the one or more storage classes that store data that is not modifiable without using a split mirror of the at least one of the one or more storage classes comprises, for each write-locked storage class on which the operation is performed:

examining a write lock of the write-locked storage class to determine if the write-locked storage class could have been written to during the operation on that storage class; and if said examining a write lock of the write-locked storage class determines the storage class could have been written to during the operation on that storage class, retrying the operation for the write-locked storage class.

19. The method as recited in claim 16, wherein the one or more storage classes that store data that is not modifiable by applications while the data is on those storage classes are configured to be write locked, and wherein the method further comprises blocking the file system software from enabling a write-locked storage class for writing for the duration of the operation.

20. The method as recited in claim 16, wherein the data includes files or portions of files.

21. The method as recited in claim 16, wherein the data comprises one or more of application data and file system metadata.

22. The method as recited in claim 16, wherein the storage classes are ordered in the hierarchy according to one or more characteristics from a highest storage class to a lowest storage class.

23. The method as recited in claim 16, wherein the storage classes are ordered in the hierarchy of storage classes according to performance characteristics from a highest storage class comprising one or more high-performance storage devices to a lowest storage class comprising one or more low-performance storage devices.

24. A computer-accessible storage medium, comprising program instructions, wherein the program instructions are computer-executable to implement:
   assigning and migrating data in a multi-class file system comprising a hierarchy of storage classes, wherein migrated data remains online within the multi-class file system, wherein one or more of the storage classes store data that is not modifiable but is readable by applications while the data is on the one or more storage classes, and wherein one or more others of the storage classes store data that is modifiable by applications while the data is on the one or more storage classes; and
   performing an operation on data stored in the multi-class file system, wherein the operation requires stable data, wherein said performing the operation comprises:
      performing the operation on at least one of the one or more storage classes that store data that is not modifiable without using a split mirror of the at least one of the one or more storage classes; and
      performing the operation on at least one of the one or more other storage classes that store data that is modifiable using a split mirror of the at least one of the one or more other storage classes.

25. The computer-accessible storage medium as recited in claim 24, wherein the operation is a backup of the storage classes.

26. The computer-accessible storage medium as recited in claim 24, wherein the one or more storage classes that store data that is not modifiable by applications while the data is on those storage classes are write locked, and wherein, in said performing the operation on at least one of the one or more storage classes that store data that is not modifiable without using a split mirror of the at least one of the one or more storage classes, the program instructions are further computer-executable to implement, for each write-locked storage class on which the operation is performed:
   examining a write lock of the write-locked storage class to determine if the write-locked storage class could have been written to during the operation on that storage class; and
   if said examining a write lock of the write-locked storage class determines the storage class could have been written to during the operation on that storage class, retrying the operation for the write-locked storage class.

27. The computer-accessible storage medium as recited in claim 24, wherein the one or more storage classes that store data that is not modifiable by applications while the data is on those storage classes are configured to be write locked, and wherein the program instructions are further computer-executable to implement blocking file system software from enabling write access to a write-locked storage class for the duration of the operation.

28. The computer-accessible storage medium as recited in claim 24, wherein the data includes files or portions of files.

29. The computer-accessible storage medium as recited in claim 24, wherein the data comprises one or more of application data and file system metadata.

30. The computer-accessible storage medium as recited in claim 24, wherein the storage classes are ordered in the hierarchy according to one or more characteristics from a highest storage class to a lowest storage class.

31. The computer-accessible storage medium as recited in claim 24, wherein the storage classes are ordered in the hierarchy of storage classes according to performance characteristics from a highest storage class comprising one or more high-performance storage devices to a lowest storage class comprising one or more low-performance storage devices.

* * * * *

UNITED STATES PATENT AND TRADEMARK OFFICE
CERTIFICATE OF CORRECTION

PATENT NO. : 7,293,133 B1 Page 1 of 1
APPLICATION NO. : 10/749299
DATED : November 6, 2007
INVENTOR(S) : John Colgrove et al.

It is certified that error appears in the above-identified patent and that said Letters Patent is hereby corrected as shown below:

On the Title Page, Item -75-

Inventors:

Please remove inventor "Michael Timpanaro" and insert
--Michael Timpanaro-Perrotta-- in place thereof.

Signed and Sealed this

Twenty-fifth Day of March, 2008

JON W. DUDAS
*Director of the United States Patent and Trademark Office*